US012811660B2

(12) United States Patent
Zhang et al.

(10) Patent No.: US 12,811,660 B2
(45) Date of Patent: Nov. 24, 2026

(54) REFERENCE SIGNALING SCHEMES IN WIRELESS COMMUNICATIONS

(71) Applicant: ZTE Corporation, Shenzhen (CN)

(72) Inventors: Shujuan Zhang, Shenzhen (CN); Zhaohua Lu, Shenzhen (CN); Bo Gao, Shenzhen (CN); Chuangxin Jiang, Shenzhen (CN); Jing Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 271 days.

(21) Appl. No.: 18/335,019

(22) Filed: Jun. 14, 2023

(65) Prior Publication Data

US 2023/0328771 A1 Oct. 12, 2023

Related U.S. Application Data

(63) Continuation of application No. PCT/CN2021/071851, filed on Jan. 14, 2021.

(51) Int. Cl.
*H04B 7/06* (2006.01)
*H04W 24/04* (2009.01)
(Continued)

(52) U.S. Cl.
CPC ........ *H04B 7/06964* (2023.05); *H04W 24/04* (2013.01); *H04W 72/1263* (2013.01); *H04W 72/542* (2023.01)

(58) Field of Classification Search
CPC ............ H04B 7/06964; H04W 72/542; H04W 24/04; H04W 72/1263
See application file for complete search history.

(56) References Cited

U.S. PATENT DOCUMENTS

2019/0306765 A1* 10/2019 Cirik .................... H04B 7/0695
2019/0349061 A1* 11/2019 Cirik ..................... H04L 1/0026
(Continued)

FOREIGN PATENT DOCUMENTS

CA 3038605 A1 9/2019
CN 109803423 A 5/2019
(Continued)

OTHER PUBLICATIONS

Extended European Search Report for co-pending EP application 21918411.6, Report dated Jan. 24, 2024, 8 pages.
(Continued)

*Primary Examiner* — Saad A. Waqas
(74) *Attorney, Agent, or Firm* — Ashurst Perkins Coie US LLP

(57) ABSTRACT

A method of wireless communication is described. The method is performed by a wireless communication device and includes receiving configuration information for a scheduling request resource or a scheduling request resource set for beam failure recovery; detecting one or more beam failures each of which is detected based on a beam failure detecting reference signal resource set; and determining, based on the detecting of the one or more beam failures, to transmit one or more scheduling request resources to a network device based on the configuration information or initiate a process to transmit a physical layer channel.

20 Claims, 15 Drawing Sheets

(51) Int. Cl.
*H04W 72/1263* (2023.01)
*H04W 72/542* (2023.01)

(56) References Cited

U.S. PATENT DOCUMENTS

2020/0404559 A1 12/2020 Koskela et al.
2022/0103232 A1 * 3/2022 Zhou .................... H04W 76/19

FOREIGN PATENT DOCUMENTS

| | | | | | |
|---|---|---|---|---|---|
| CN | 111278122 | | | 6/2020 | |
| KR | 20190130174 | A | * | 11/2019 | ............ H04W 72/23 |
| KR | 20200008666 | A | * | 1/2020 | ........... H04L 5/0048 |
| WO | 2020/0010615 | | | 1/2020 | |
| WO | WO-2020057665 | A1 | * | 3/2020 | ......... H04B 7/06966 |

OTHER PUBLICATIONS

International Search Report and Written Opinion for PCT/CN2021/071851, filed Jan. 14, 2021, Report dated Sep. 16, 2021, 12 pages.
Futurewei "Beam management for simultaneous multi-TRP transmission with multipanel reception" 3GPP TSG RAN WG1 #102-e R1-2005287, e-Meeting, Aug. 17-28, 2020, 4 pages.
Office Action for co-pending CA application 3,203,489, Report dated Nov. 12, 2024, 6 pages.
Substantive Examination Adverse Report for co-pending MY Patent Application No. PI 2023003248, dated Apr. 24, 2026, 4 pages.
Office Action for co-pending CA application 3,203,489, Report dated Jun. 1, 2026 4 pages.
First Office Action for co-pending Chinese Patent Application No. 202180090534.6, dated Jul. 1, 2026, 16 pages with unofficial English translation.

* cited by examiner

REFERENCE SIGNALING SCHEMES IN WIRELESS COMMUNICATIONS

CROSS-REFERENCE TO RELATED APPLICATION

This application is a continuation and claims priority to International Application No. PCT/CN2021/071851, filed on Jan. 14, 2021, the disclosure of which is hereby incorporated by reference herein in its entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for signaling exchange schemes in wireless communications.

In one aspect, a wireless communication method is disclosed. The wireless communication method is performed by a wireless communication device and comprises: receiving configuration information for a scheduling request resource or a scheduling request resource set for beam failure recovery; detecting one or more beam failures each of which is detected based on a beam failure detecting reference signal resource set; and determining, based on the detecting of the one or more beam failures, to transmit one or more scheduling request resources to a network device based on the configuration information or initiate a process to transmit a physical layer channel.

In another aspect, a wireless communication method is disclosed. The wireless communication method is performed by a wireless communication device and comprises: detecting a beam failure; reporting, in response to the detecting of the beam failure, to a network device, at least one of candidate reference signal resource indexes; and determining a mapping relationship between codepoints of a bit field in control information and the at least one of candidate reference signal resource indexes.

In another aspect, a wireless communication method is disclosed. The wireless communication method is performed by a wireless communication device and comprises: detecting one or more beam failures; determining, in response to the one or more beam failures, a transmission mechanism to transmit one of a medium access control element (MAC-CE), a scheduling request, or a physical layer channel, based on at least one of an availability of an uplink channel to carry the medium access control element or an availability of the scheduling request, or information of the one or more beam failures; and transmitting, based on the determining, a selected transmission mechanism.

In another aspect, a wireless communication method is disclosed. The wireless communication method is performed by a wireless communication device and comprises: detecting two beam failures each of which is based on a beam failure detecting reference signal set; selecting, in response to the detecting of the two beam failures, one or more candidate reference signals; and transmitting one or more signals based on the one or more candidate reference signals.

In another aspect, a wireless communication method is disclosed. The wireless communication method is performed by a wireless communication device and comprises: detecting a beam failure based on a beam failure detecting reference signal set; determining, in response to the detecting of the beam failure, whether a candidate is selected from a candidate reference signal set; and determining, based on the determining, whether to activate or deactivate a control resource set (CORESET) pool or a hybrid automatic repeat request-acknowledgement (HARQ-ACK) feedback.

In another aspect, a wireless communication method is disclosed. The wireless communication method is performed by a wireless communication device and comprises: receiving a configuration information with a reference signal resource with a transmission configuration indication state that includes a quasi co location (QCL)-reference signal (RS) that is associated with QCL-Type D.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

These, and other features, are described in the present document.

DETAILED DESCRIPTION

Figure 1:
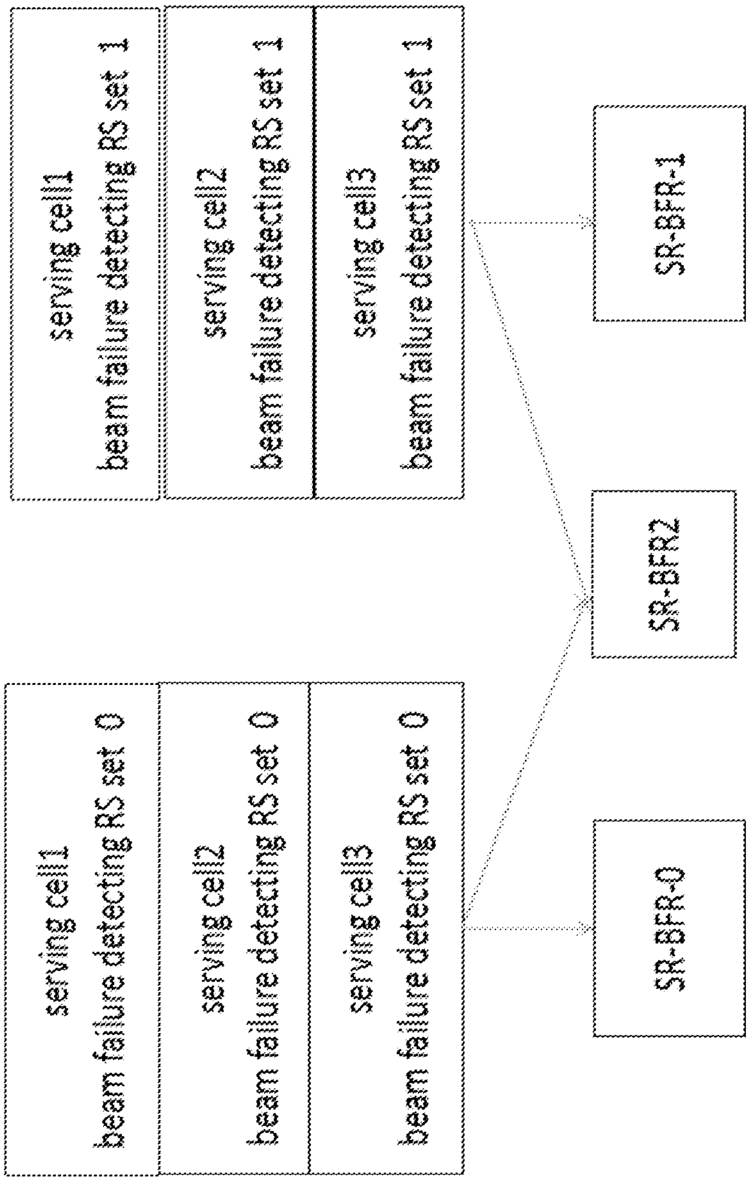
FIG. 1 shows an example of a selection of a SR-BFR (schedule request-beam failure recovery) when a user device detects beam failure based on at least one of beam failure detecting reference signal (RS) set associated with a parameter index.

The disclosed technology provides implementations and examples of reference signaling schemes in wireless communications, e.g., reference signaling design and configurations.

New radio (NR) adopts beam failure recovery (BFR) process to recover link quickly and save power at UE for the UE reporting beam failure information only if beam failure is detected by the UE. The links between UE and gNB can be recovered quickly when the link fails. The UE will report beam failure information to gNB once the UE detects beam failure occurrence based on beam failure detecting resource set. The current BFR process is for one serving cell. The UE initiates BFR process only when all links of one serving cell fail. When one serving cell includes multiple transmission/reception points (TRPs), the UE only initiate BFR process when all TRPs fail. The gNB can't process the recovery for one TRP in time. Some implementations of the disclosed technology discuss how to recover a link between UE and TRP quickly.

When the UE detects beam failure, the UE may transmit a BFR-SR (schedule request resource), to gNB. The gNB can schedule a physical uplink shared channel (PUSCH) for the UE after receiving the BFR-SR, then the UE will transmit a second message, e.g., BFR-MAC-CE, in the PUSCH. The BFR MAC-CE includes BFR information. The BFR information includes at least one of: a serving cell indication for which beam failure is detected, a parameter index for which beam failure is detected, whether a new candidate reference signal (RS) index is found from a candidate RS set corresponding to the serving cell indication or the parameter index, or new candidate reference signal resource index In another implementation, when the UE detects beam failure and there is available UL-SCH, the UE transmits a BFR-MAC-CE on the UL-SCH, otherwise the UE transmits a BFR-SR (schedule request) to gNB. The gNB can schedule PUSCH for the UE after receiving the BFR-SR, then the UE will transmits BFR-MAC-CE in the PUSCH. The BFR MAC-CE includes the BFR information.

One or more beam failures are detected by monitoring beam failure reference signal (RS) sets and assessing them if a beam failure triggering condition for any beam failure RS set has been met. The beam failure RS set is associated with second information. The second information includes at least one of a serving cell index, or a parameter index. The parameter index includes at least one of: an index of a CORESET pool, an index of a PUCCH resource set, an index of a set of channel, an index of beam failure detecting reference signal resource set, an index of candidate reference signal resource set, an index associated with one or more beam failure parameters, a physical cell index (PCI), an order index of a candidate RS index for a serving cell (or for a BWP), or an index of a BFR process for a serving cell (or for a BWP). The parameter index can be referred to as another name such as a beam failure index, but as long as at least one of such item is included, that element can be considered as the parameter index.

The UE assesses the radio link quality of all reference signals (RSe) in a beam failure detecting RS set. If radio link quality of all RSs in a beam failure detecting RS set is worse than a threshold, the UE adds 1 to the number of beam failure instance indications. When the number of the beam failure instance indications reaches a predefined number, the beam failure triggering condition is met and thus, a beam failure corresponding to the beam failure detecting RS set is detected. For example, when assuming that the UE monitors E beam failure occurrences, the UE detects Z beam failures, wherein E is equal to or larger than 1 and Z is smaller than E. For each beam failure detection that is determined by the UE, the UE initiate a BFR process. In response to Z beam failures detections, BFR processes are triggered. The UE will trigger to transmit one of BFR-MAC-CE, SR-BFR, PRACH to indicate gNB information about the beam failure detection. For each beam failure of the E beam failures, the number of the beam failure instance indications will be set to 0 if time interval between two successive beam failure instance indication is larger than a value or the UE trigger the BFR process.

Implementation 1

For example, the UE receives configuration information including serving cell index for SR-BFR. The SR-BFR is transmitted on the serving cell with the serving cell index.

In another example, the UE receives configuration information including serving cell index list for an SR-BFR. When the UE detects beam failure for at least one serving cell, the UE determines a first serving cell set from the serving cell index list, and transmits the SR-BFR on a serving cell with the lowest index in the first serving cell set. The first serving cell set refers to a serving cell set including serving cells other than the beam failure serving cell on which the beam failure is detected.

In another example, the UE transmits the SR-BFR on each serving cell in the first serving cell set. The SR-BFR on different serving cell can be considered as multiple SR-BFRs even other information of the SR-BFR except serving cell is same. The first serving cell set doesn't include the serving cell whose beam failure is detected, i.e., the first serving cell set includes serving cells in the serving cell set except the beam failure serving cell. In some implementation, if the first serving cell set is empty, i.e., the beam failure is detected for each of the serving cell in the serving cell set and thus, the UE initiates PRACH (Physical Random Access Channel) process without transmitting the SR-BFR.

Alternatively, when beam failure is detected for a serving cell, the UE determines a second serving cell set associated with the beam failure serving cell, the second serving cell set will not be included in the first serving cell set. For example, Each serving cell will be associated with a second serving cell set. The beam in the second serving cell set is similar. The UE detects beam failure for one or more serving cells in the second serving cell. If beam failure is detected for any one serving cell in the second serving cell set, the UE knows that all the serving cells in the second serving cell set will fail. The UE will not choose a SR-BFR on a serving cell in the second serving cell set associated with a beam failure serving cell. The second serving cell set for a serving cell is based on signaling or a rule. For example, one TCI state update signaling will be applied to all serving cells in a serving cell sets.

Implementation 2

The UE receives configuration information including a parameter index for a BFR-SR. Item(s) included in the configuration information that UE receives may be referred to as first information including a parameter index. The parameter index includes at least one of: an index of a CORESET pool, an index of a PUCCH resource set, an index of a set of channel, an index of beam failure detecting reference signal resource set, an index of candidate reference signal resource set, an index associated with one or more beam failure parameters, a physical cell index (PCI), an order index of a candidate RS index for a serving cell or for a BWP, or an index of a BFR process for a serving cell or for a BWP. The parameter index can be referred to as another name such as a beam failure index, but as long as at least one of such item is included, that element can be considered as the parameter index.

The UE can be configured with more than one parameter indexes for a serving cell/BWP. Each of the parameter index is associated with a BFR parameter and a BFR process. One BFR MAC-CE includes beam failure information for one parameter index. Beam failure information associated with different parameter indexes can be reported in different BFR MAC-CEs, wherein this type of BFR MAC-CE can be named separate feedback BFR MAC-CE. In another example, one BFR MAC-CE includes beam failure information for more than one parameter indexes, wherein this type of BFR MAC-CE can be named joint feedback BFR MAC-CE. The gNB can inform the UE which one of the two BFR MAC-CE formats is to be used by UE. The signaling of information as to which one of the two BFR MAC-CE formats is to be used by UE can also indicate which one of HARQ-ACK feedback formats which includes separate HARQ-ACK feedback and joint HARQ-ACK feedback.

When the UE detects beam failure based on at least one of beam failure detecting RS set associated with a parameter index, the UE will transmit the SR-BFR associated with the same parameter index as shown in FIG. 1. In FIG. 1, a serving cell (or a BWP of a serving cell) will be configured with up to two BFR processes and BFR parameters, each of which is associated with a parameter index. The UE detects E beam failures each of which is associated with a beam failure detecting RS set, if at least one (Z) of beam failure is detected for at least one of beam failure detecting RS sets associated with the parameter index 0, the UE will transmit SR-BFR0 which is associated with the parameter index 0.

If at least of beam failures is detected for at least one of beam failure detecting RS sets associated with the parameter index 1, the UE will transmits SR-BFR1 associated with parameter index 1. Each of the E beam failure is associated with second information such as serving cell, BWP, parameter index.

In some implementation, if the UE needs to transmit SR-BFR0 and SR-BFR1 simultaneously as beam failure is detected for both parameter indexes, 1) the UE may transmit SR-BFR0 and SR-BFR1, or 2) the UE may transmit SR-BFR2 when the beam failure is detected for both parameter indexes, or 3) the UE may transmit SR-BFR chosen from SR BFR0 and SR-BFR1 based on the time information and/or serving cell of the two SR-BFR.

Implementation 3

For a parameter index, the UE may be configured with more than one SR-BFRs.

Figure 2:
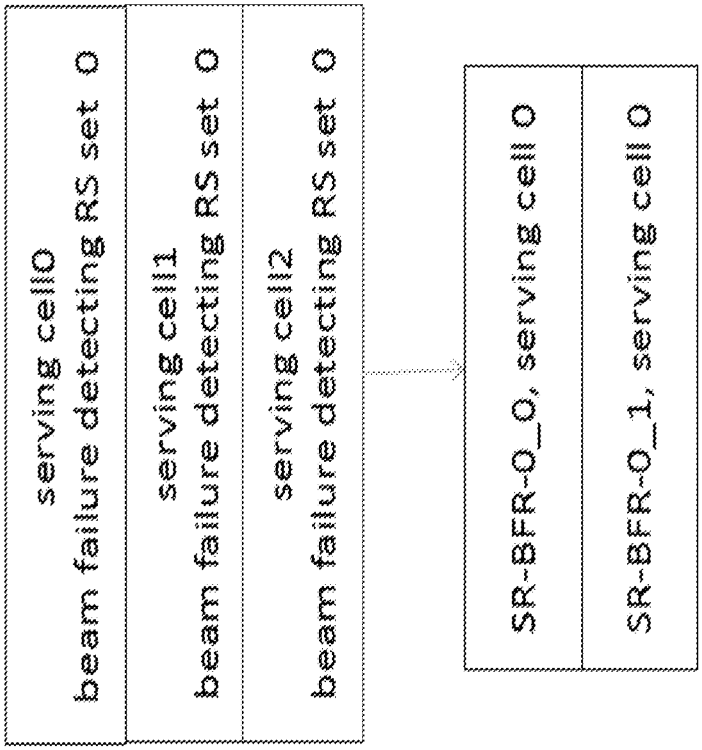
FIG. 2 shows an example of a user device that is configured with two SR-BFRs on a serving cell for a parameter index.

For example, the UE is configured with two SR-BFRs on a serving cell for a parameter index as shown in FIG. 2. When beam failure is detected based on at least one of the beam failure detecting RS set associated with the parameter index (such as parameter index 0) for a serving cell rather than the serving cell of the SR-BFR (such as serving cell 0), the UE transmits the first SR-BFR (such as SR-BFR0_0), otherwise the UE transmits SR-BFR0_1

Figure 3:
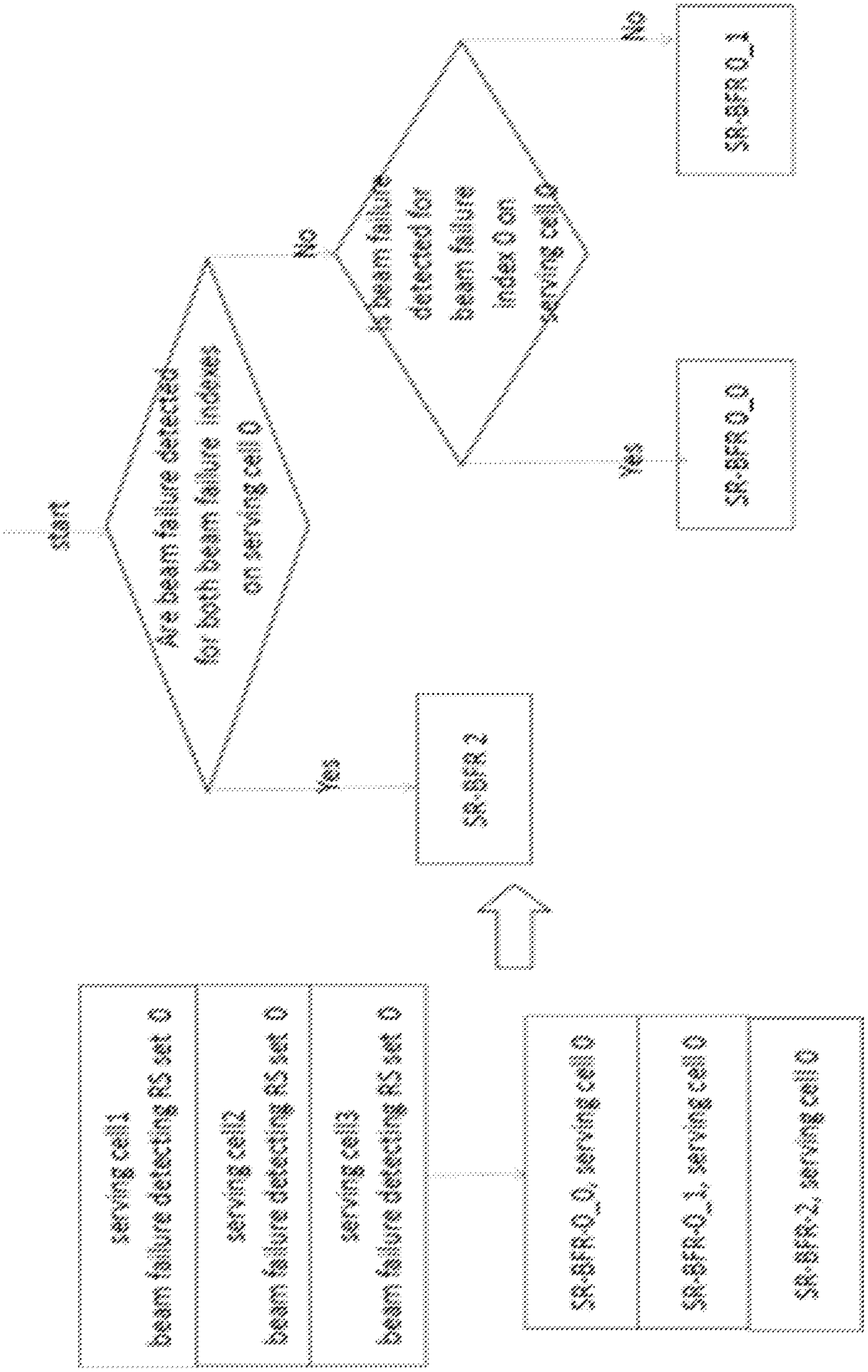
FIG. 3 shows an example of a user device that is configured with three SR-BFRs on a serving cell for a parameter index and selection between the three SR-BFR according to the second information associated with Z detected beam failures.

In another implementation, for a parameter index, the UE may be configured with three SR-BFRs on a serving cell for a parameter index as shown in FIG. 3. For a parameter index, the UE is configured with three SR-BFRs, i.e., SR-BFR0_0, SR_BFR0_1, SR-BFR 2, on a serving cell. If the beam failure is detected for both parameter indexes on serving cell 0, the UE will transmit SR-BFR2, else if the UE detects beam failure for parameter index 0 in the serving cell 0, the UE transmits SR-BFR 0_0, else if the UE doesn't detect beam failure for any parameter index in the serving cell 0, the UE transmits SR-BFR 0_1.

Implementation 4

For a serving cell group, the UE may be configured with a SR-BFR list which includes one or more SR-BFRs. The serving cell group can be a MCG (master cell group), SCG (secondary cell group), serving cell group for a MAC entity. Each SR-BFR in the SR-BFR list is configured with a serving cell index and/or a parameter index that is included as the first information. When beam failure is detected based on at least one beam failure detecting RS set associated with a serving cell in the serving cell group, the UE determines a SR-BFR from the SR-BFR list based on second information of the at least one beam failure detecting RS set and the UE transmits the selected SR-BFR, or the second information of at least one beam failure associated with the at least one of detecting RS set and the UE transmits the selected SR-BFR. The second information includes at least one of: a serving cell index, a parameter index, or time domain occasion.

In another example, the UE selects a SR-BFR from the SR-BFR list based on a relationship between the second information of at least one beam failure detecting RS set (or the at least one beam failure) and the third information of SR-BFRs in the SR-BFR list, and the UE transmits the selected SR-BFR. In some implementations, the third information includes a serving cell index or an parameter index. In some implementation, the UE selects a SR-BFR from the SR-BFR list according to the time domain information of the SR-BFR. In some implementation, the UE selects a SR-BFR from the SR-BFR list according to the BFR MAC-CE format which includes separate BFR-MAC-CE and joint BFR MAC-CE. One separate BFR MAC-CE includes BFR information associated with one parameter index. One joint BFR MAC-CE includes BFR information associated with more than one parameter indexes.

In some implementation, the UE selects a SR-BFR based on at least one of following methods:

Example Method 1

The UE determines a third serving cell set including multiple second serving cell sets or multiple beam failure serving cells each of which beam failure are detected for both parameter indexes and each second serving cell set associated with a beam failure serving cell for which two beam failures are detected. Each of the two beam failures is associated with a parameter index. The UE excludes SR-BFR in the third serving cell set from the SR-BFR list, and the UE will not select the SR-BFR in the third serving cell set.

For each SR-BFR of the remaining SR-BFRs, if beam failure is not detected for the serving cell of the SR-BFR based on any one beam failure detecting RS set for the serving cell, the UE can select the SR-BFR irrespective of its parameter index. If beam failure is detected for the serving cell based on a beam failure detecting RS set associated with parameter index same as the SR-BFR, the UE can select the SR-BFR. If beam failure is detected for the serving cell based on a beam failure detecting RS set associated with parameter index different from the SR-BFR, the UE cannot select the SR-BFR. In some implementations, if beam failure is detected for the serving cell based on a beam failure detecting RS set associated with parameter index different from the SR-BFR, the UE can select the SR-BFR. If beam failure is detected for the serving cell based on a beam failure detecting RS set associated with parameter index same as the SR-BFR, the UE cannot select the SR-BFR.

If the UE selects multiple SR-BFRs according to above rule, the UE can further select one SR-BFR with lowest serving cell index among the multiple SR-BFRs. If there are multiple SR-BFRs with the lowest serving cell index, the UE selects SR-BFR according to the parameter index and/or SR-BFR resource index, for example the UE will select the SR-BFR with the lowest parameter index and/or lowest SR-BFR resource index. If the UE can't select any one SR-BFR according to above rule, the UE will initiate PRACH.

In another example, if the UE selects multiple SR-BFRs according to above rule, the UE can further select one SR-BFR with a parameter index according to two beam failure serving cell sets with the two parameter indexes. For example, the UE may choose a SR-BFR with a parameter index for which there is more beam failure serving cells. For example, there are two beam failure serving cells with parameter index 0 and there are four beam failure serving cells with parameter index 1, then the UE will choose the SR-BFR with parameter index 1. If the UE can select more than one SR-BFRs with a parameter index, then the UE can select a SR-BFR with lowest serving cell index from the more than one SR-BFRs.

Example Method 2

The UE may select a first SR-BFR whose parameter index is same as at least one beam failure detecting RS set and whose serving cell is different from any of the at least one beam failure detecting RS set. If there are multiple first SR-BFRs, the UE will transmit a SR-BFR with a lowest serving cell index among the multiple first SR-BFRs. If there is no first SR-BFR, the UE selects a second SR-BFR on a serving cell for which beam failure is not detected based on beam failure detecting RS set associated with another parameter index. If there is no second SR-BFR, the UE selects SR-BFR2 which is associated with parameter index 0 and parameter index 1. Or if there is no second SR-BFR, the UE will initiate a PRACH process.

Example Method 3

The UE may select a first SR-BFR whose serving cell is different from any of the at least one beam failure detecting RS set. If there are multiple first SR-BFRs, the UE will transmit a SR-BFR with a same parameter index as the at least one beam failure detecting RS set. If there are multiple SR-BFRs with the same parameter index, the UE transmits SR-BFR with the lowest serving cell index among the multiple first SR-BFRs. If there is no first SR-BFR, the UE selects a second SR-BFR on a serving cell for which beam failure is not detected based on beam failure detecting RS set associated with another parameter index. If there is no second SR-BFR, the UE selects SR-BFR2 which is associated with parameter index 0 and parameter index 1.

Example Method 4

The UE may select a SR-BFR from the SR-BFR list based on a signaling from gNB. The signaling indicates that whether the parameter index of the selected SR-BFR needs to be same with each of at least one beam failure detecting RS set. In another example, the signaling indicates that whether the parameter index of the selected SR-BFR needs to be same with a beam failure detecting RS set of at least one beam failure detecting RS set. In another example, the signaling indicates that whether the parameter index of the selected SR-BFR needs to be same with each of at least one beam failure detecting RS set when there is no beam failure for the serving cell of the selected SR-BFR.

Implementation 5

For a serving cell group, the UE may be configured with a SR-BFR. The SR-BFR may be configured with an index list including first information, for example, the index list includes a serving cell index list and/or a parameter index list and/or spatial relation reference signal list and/or power information and/or time/frequence/code-domain resource information. If at least one beam failure is detected, the UE transmits the SR-BFR using the first information which is selected from the first information list according to second information of a beam failure detecting RS set based on which beam failure is detected. In another example, the UE transmits the SR-BFR using the first information which is selected from the first information list according to the relationship between second information of a beam failure detecting RS set on which beam failure is detected based and information of the SR-BFR. The second information of a beam failure is associated with a beam failure detecting RS set on which the beam failure is detected based.

In response to at least one of beam failures is detected, the UE will selects F SR-BFR to transmit in Implementation 4, but the UE will select first information used for the transmission of SR-BFR. The method of selecting F SR-BFR from a SR-BFR set (e.g., a list) can also be similarly applied to the selecting first information from the first information list for the transmission of SR-BFR.

Implementation 6

If the UE detects beam failure for a serving cell or for a parameter index of a serving cell, the UE can report a candidate RS resource index for a serving cell index, or for a BWP (bandwidth part), or for a serving cell index and parameter index.

The UE can determine a mapping relationship between TCI codepoints and the candidate RS resource index. The TCI codepoint corresponds to TCI field in the DCI which is used to indicate TCI state of PDSCH/CORESET/CSI-RS/PUSCH/PUCCH/SRS. The TCI states include QCL-RS of the PDSCH/CORESET/CSI-RS and/or spatial relationship reference signal for PUSCH/PUCCH/SRS. The mapping between TCI codepoints and TCI states is for a serving cell/BWP/parameter index corresponding to the candidate RS resource index.

The UE may determine the mapping relationship based on parameter index of the candidate RS resource index as shown in Table 1 and Table 2. In Table 1, the candidate RS resources are mapped to the last three codepoints. In Table 2, the candidate RS resource is mapped to the last codepoint and the Table 2 is associated with a parameter index same as a parameter index of the candidate RS resource. There are two tables each of which is associated with a parameter index respectively. In Table 1 and Table 2, the candidate RS resource is mapped to the last codepoints start from 111. In another implementation, the candidate RS resource is mapped to the last available codepoints start from M−1 where M is the number of TCI codepoints which is mapped to at least one of TCI states before. In Table 1 and in Table 2, each of the candidate RS resources corresponds to a TCI state.

Similarly above method can also be applied to determine the mapping relationship between codepoints of other bit field in a DCI and the reported candidate reference signal resources.

TABLE 1

| TCI codepoint | TCI state |
|---|---|
| 000 | TCI state 0 |
| 001 | TCI state 5 |
| 010 | TCI state 27, TCI state 48 |
| 011 | TCI state 27, TCI state 33 |
| 000 | Reserved |
| 001 | Candidate RS resource with parameter index 0, Candidate RS resource with parameter index 1 |
| 010 | Candidate RS resource with parameter index 1 |
| 011 | Candidate RS resource with parameter index 1 |

TABLE 2

| TCI codepoint | TCI state |
|---|---|
| 000 | TCI state 0 |
| 001 | TCI state 5 |
| 010 | TCI state 27, TCI state 48 |
| 011 | TCI state 27, TCI state 33 |
| 000 | Reserved |
| 001 | Reserved |
| 010 | Reserved |
| 011 | Candidate RS resource |

Implementation 7

Figure 4:
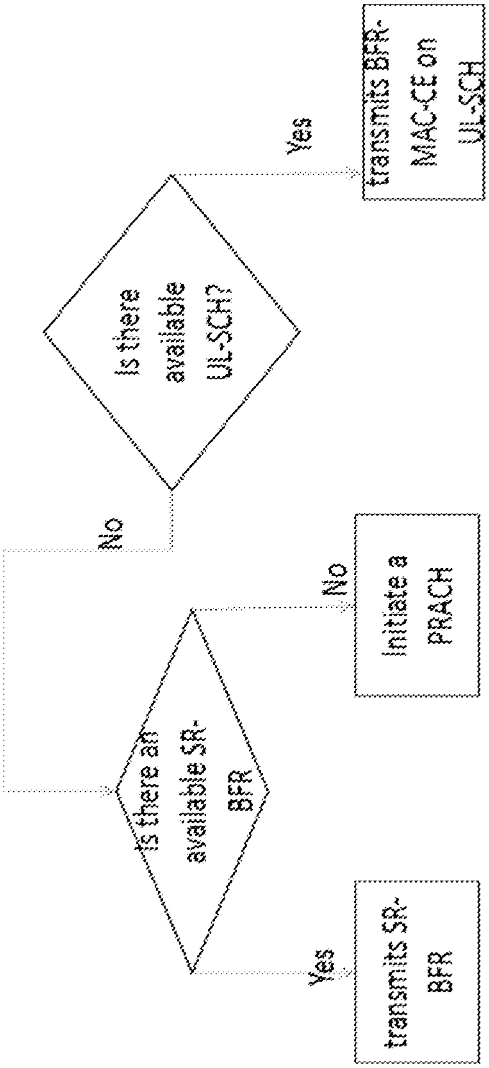
FIG. 4 shows an example of selecting from SR-BFR, BFR MAC-CE and PRACH when the UE detects Z beam failures.

FIG. 4 shows an example of operations of an UE when the UE detects at least one of beam failures each of which is based on a beam failure detecting RS set. Referring to FIG. 4, if there is available UL-SCH, the UE transmits the BFR-MAC-CE in the UL-SCH. If there is available SR-BFR, the UE transmits the SR-BFR. Otherwise, the UE initiates PRACH as shown in FIG. 4.

A UL-SCH is available when it satisfies a predefined condition which includes one of following conditions:

Condition 1: The UL-SCH will be in a PUSCH on a serving cell for which no beam failure is detected or the UL-SCH will be in a PUSCH on a serving cell with only one beam failure occurrence.

Condition 2: The UL-SCH will be in a PUSCH on a serving cell for which no beam failure is detected or the UL-SCH will be in a PUSCH on a serving cell with only one beam failure occurrence whose parameter index is same with the PUSCH.

Condition 3: The UL-SCH will be in a PUSCH on a serving cell for which no beam failure is detected or the UL-SCH will be in a PUSCH on a serving cell with only one detected beam failure whose parameter index is different from the PUSCH.

Condition 4: The UL-SCH will be in a PUSCH on a serving cell in a four serving cell set. The four serving cell set includes multiple second serving cell sets. A second serving cell set includes a serving cell for which no beam failure is detected or only one beam failure is detected. The signaling for updating TCI state or spatial relationship is applied to all the serving cell in a second serving cell set.

Condition 5: The UL-SCH will be in a PUSCH on a serving cell in a four serving cell set. The four serving cell set includes multiple second serving cell sets. A second serving cell set includes a serving cell for which no beam failure is detected or only one beam failure is detected which is associated with the same parameter index as PUSCH. The signaling for updating TCI (transmission configuration indication) state or spatial relationship is applied to all the serving cell in a second serving cell set.

Condition 6: The UL-SCH will be in a PUSCH on a serving cell in a four serving cell set. The four serving cell set includes multiple second serving cell sets. A second serving cell set includes a serving cell for which no beam failure is detected or only one beam failure is detected which is associated with the different parameter index as PUSCH. The signaling for updating TCI state or spatial relationship is applied to all the serving cell in a second serving cell set.

In some implementations, the availability of a SR-BFR can be determined by using Conditions 1 to 6 above. Thus, a SR-BFR is available when it satisfies a predefined condition which includes one of above conditions. In determining the availability of the SR-BFR, UL-SCH and PUSCH that appear in the above conditions are replaced with SR-BFR. A SR-BFR is available also when the UE is configured with at least one of SR-BFR.

Figure 5:
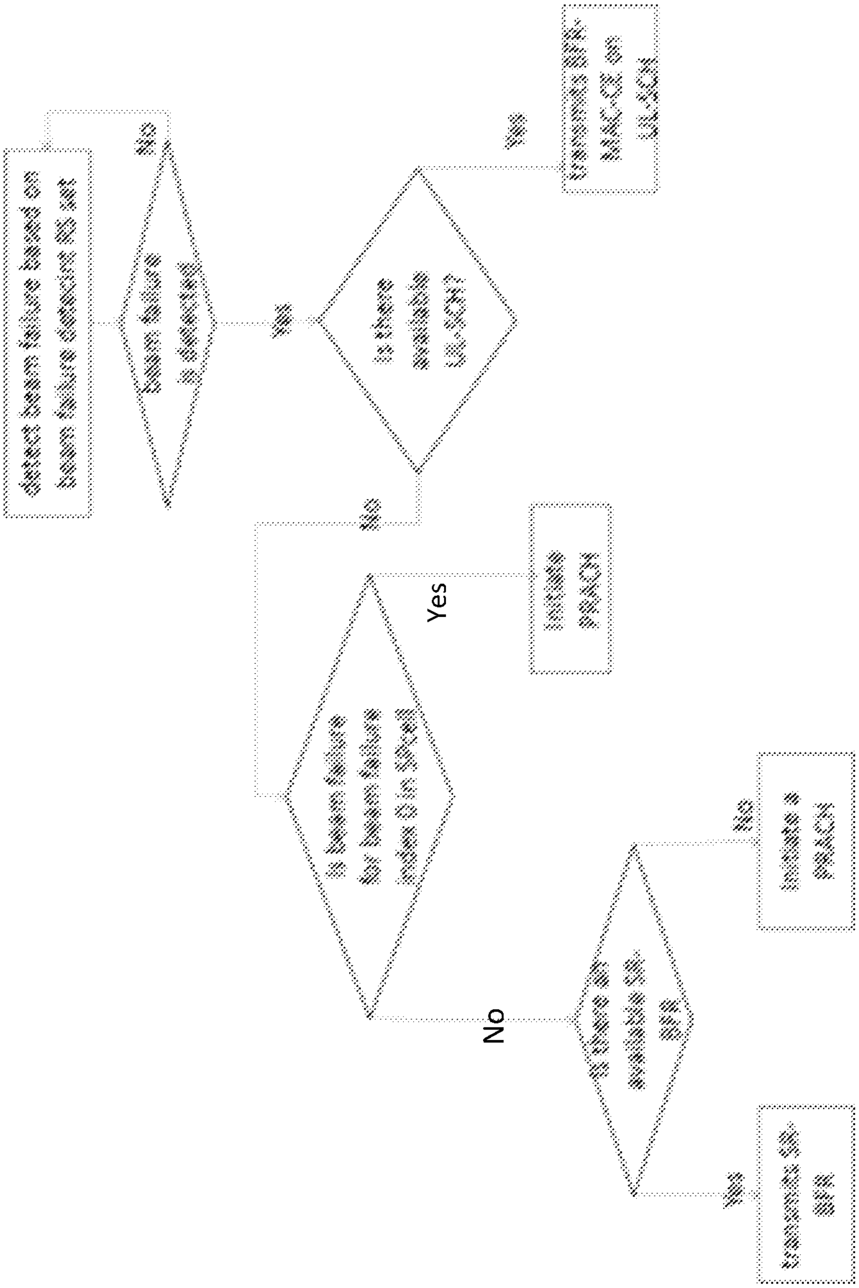
FIG. 5 shows another example of selecting from SR-BFR, BFR MAC-CE and PRACH when the UE detects Z beam failures.

If there is no available UL-SCH and SR-BFR, the UE will initiate PRACH process for beam failure recovery. Or if there is no available SR-BFR, the UE will initiate PRACH process for beam failure recovery. And/or if there is no configured SR-BFR, the UE will initiate PRACH process for beam failure recovery FIG. 5 shows another example of operations of an UE when the UE detects beam failure based on beam failure detecting RS set 0 for SPcell (special serving cell). Referring to FIG. 5, it is determined whether there is available UL-SCH. If there is an available UL-SCH, a BFR-MAC-CE on the UL-SCH is transmitted. If there is no available UL-SCH, it is determined whether the beam failure is for parameter index 0 of the SPCell. If the beam failure is with parameter index 0 of the SPCell, the UE will initiate PRACH process regardless of the presence of an available SR-BFR. If the beam failure is not with parameter index 0 of the SPCell, it is determined whether there is an available SR-BFR. If there is no available SR-BFF, PRACH process is initiated. If there is an available SR-BFR, the SR-BFR is transmitted.

Figure 6:
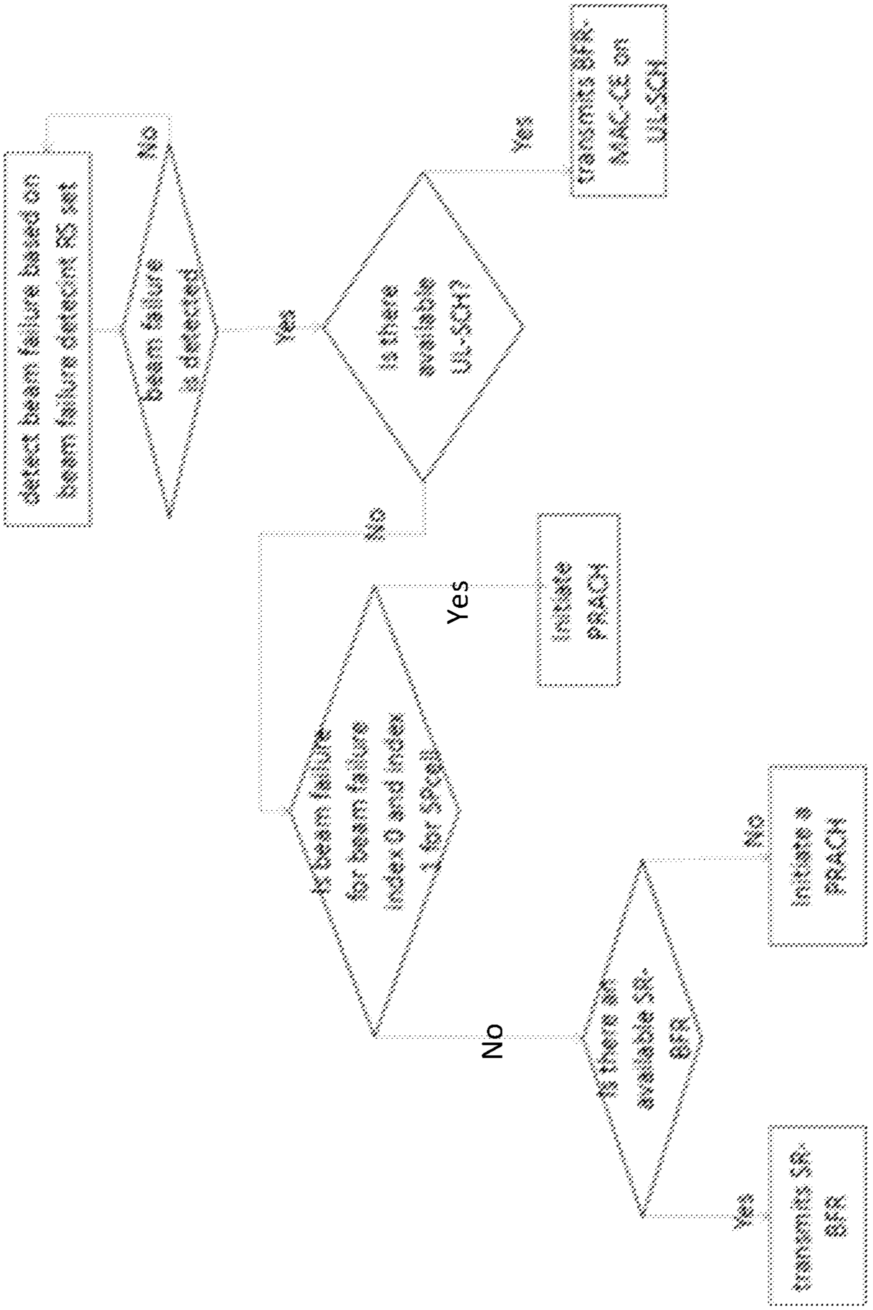
FIG. 6 shows another example of selecting from SR-BFR, BFR MAC-CE and PRACH when the UE detects Z beam failures.

FIG. 6 shows another example of operations of an UE when the UE detects beam failure for both beam failure detecting RS set 0 and beam failure detecting RS set 1 of SPcell. Referring to FIG. 6, it is determined whether there is available UL-SCH. If there is an available UL-SCH, a BFR-MAC-CE on the UL-SCH is transmitted. If there is no available UL-SCH, it is determined whether both beam failures that are associated with the parameter index 0 and the parameter index 1 of the SPCell, respectively, are detected. If the beam failure 0 and beam failure 1 of the SPCell are both detected, the UE will initiate PRACH process regardless of the presence of an available SR-BFR. If the beam failure associated with the parameter index 0 and the beam failure associated with the parameter index 1 are not both detected, it is determined whether there is an available SR-BFR. If there is no available SR-BFR, PRACH process is initiated. If there is an available SR-BFR, the SR-BFR is transmitted. The PRACH process is initiated according to whether X beam failures of the SR-BFR is detected. The beam failure of the SR-BFR includes one of: beam failure of the serving cell of the SR-BFR, beam failure of the BWP of the SR-BFR, beam failure of the parameter index and serving cell index of the SR-BFR, or beam failure assessed based on a beam failure detecting reference signal resource set associated with a second information corresponding to a third information of the SR-BFR.

Implementation 8

Figure 7:
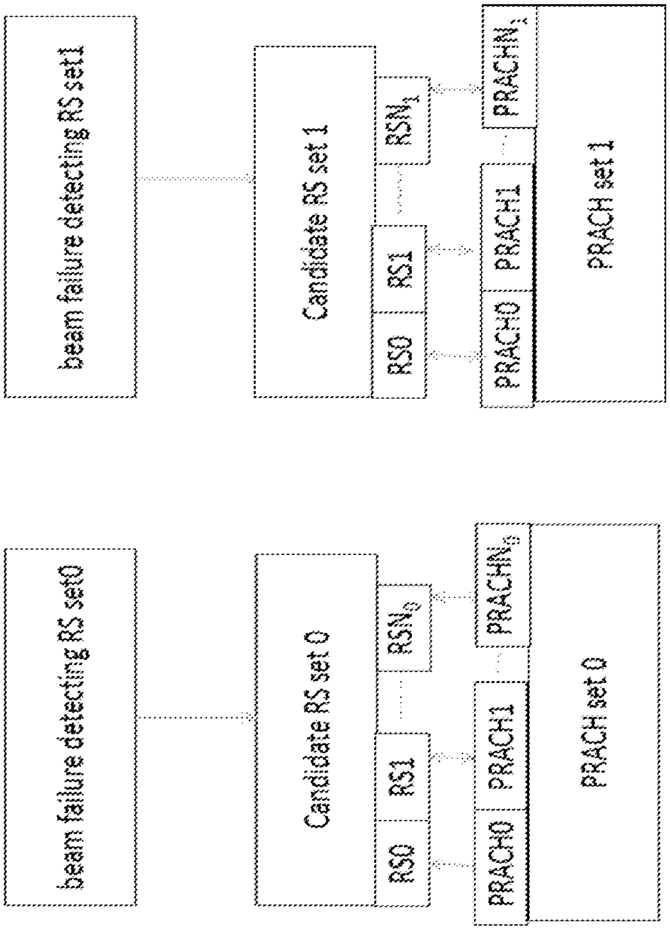
FIG. 7 shows an example of receiving mapping between candidates RS and PRACH resource for both candidate RS sets, each of which is associated with a parameter index.

For SPcell, the UE can be configured with two beam failure detecting RS sets, each of which is associated with a parameter index and a candidate RS set. The UE can be configured with mapping relationship between RSs in the candidate RS set and PRACHes in the PRACH set as shown in FIG. 7.

In some implementations, if the UE detects beam failure for both beam failure detecting RS sets, each of which is associated with a parameter index, the UE initiates a PRACH for beam failure recovery. The UE will select a candidate RS from candidate RS set 0 first and transmit PRACH corresponding to the selected candidate RS for candidate RS set 0. If the UE cannot select a candidate RS from the candidate RS set 0, the UE will select a candidate RS for candidate RS set 1 and transmit PRACH corresponding to the selected candidate RS for candidate RS set 1. If the UE cannot select a candidate RS from candidate RS set 1, the UE can initiate a contention-based PRACH. The UE is configured with one BFR search space set and one BFR CORESET which is shared between two parameter indexes, the QCL-RS of the BFR-CORESET is the selected candidate RS corresponding to the transmitted PRACH.

In some implementation, if the UE detects beam failure for both beam failure detecting RS sets, each of which is associated with a parameter index, the UE can select a candidate RS from candidate RS set 0 and candidate RS set 1 respectively. If the UE can select two candidate RSs from the two RS sets, the UE can transmit two PRACHs each of which corresponds to one selected candidate RS. The UE can be configured with two BFR search space sets, each of which is associated with a parameter index respectively. The QCL-RS of each of the two BFR search space sets is the selected candidate RS with parameter index as the search space set. The two BFR search space set can be associated with a same BFR-CORESET or are associated with a BFR CORESET respectively. The UE will monitor each of the two BFR search spaces after transmitting the corresponding PRACH. If the UE monitors a PDCCH in one of the two BFR search spaces, the UE will consider the corresponding PRACH transmission completed successfully. In another implementation, if the UE monitors a PDCCH in any one of the two BFR search spaces, the UE will consider the two PRACH transmission completed and stop them.

In some implementation, the UE will be configured with one BFR-CORESET and one search space sets, if the UE transmits a PRACH corresponding to a candidate RS, the QCL-RS of the BFR-CORESET is the selected candidate RS. If the UE transmits two PRACHs corresponding to two candidate RSs, the QCL-RS of the BFR-CORESET are the selected two candidate RSs.

In some implementation, two BFR search space sets are linked. Each of the two BFR search space sets is associated with a respective parameter index.

Implementation 9

The UE is configured with a mapping relationship between candidate RSs and PRACH resource which includes i) preamble index, or ii) preamble index and occasion index. For example, a PRACH resource is associated with a candidate RS set including more than one candidate RSs. When the selected candidate RS(s) belongs to a candidate RS set, the UE will select the PRACH resource and transmit a preamble in the PRACH resource to gNB.

In some implementation, the UE will feedback BFR MAC-CE with a relative index of the selected candidate RS among the candidate RS set corresponding to one PRACH resource.

In some implementation, the UE will feedback BFR MAC-CE including information indicating whether the number of selected candidate RS is smaller than the number of candidate RS in a candidate RS set corresponding to one PRACH resource. Only when the information indicates that the number of selected candidate RSs is smaller than the number of candidate RS in the candidate RS set corresponding to one PRACH resource, the UE will feedback the relative index of the selected candidate RS among the candidate RS set. When the information indicates that the number of selected candidate RS is not smaller than the number of candidate RSs in the candidate RS set corresponding to one PRACH resource, it means that the UE selects all the candidates of the candidate RS set corresponding to one PRACH resource. When the UE selects multiple candidate RSs, the multiple candidate RSs need to be in a candidate RS set.

In a similar way, the UE can be configured with a SR-BFR list. Each SR-BFR corresponds to a candidate RS set.

Implementation 10

When the UE detects beam failure based on a beam failure detecting RS set and the UE cannot select a candidate RS from a candidate RS set corresponding to the beam failure detecting RS set, the UE will deactivate a CORESET pool corresponding to the beam detecting RS set at a predefined time. The UE may stop feedback HARQ-ACK PDCCH and/or PDSCH associated with the CORESET pool. A CORESET pool corresponding to the beam detecting RS set includes a CORESET pool with parameter index same as the beam detecting RS set.

In some implementation, the UE will deactivate the CORESET pool when the CORESET pool satisfies a predefined condition. For example, the predefined condition includes that i) the CORESET pool is not in the SPcell, and/or ii) the serving cell associated with the beam failure detecting RS set is configured with more than one CORESET pools, and/or iii) beam failure is detected for not all of the beam failure detecting RS sets of the serving cell/BWP. A serving cell is configured with more than one CORESET pools means that any BWP of the serving cell is configured with more than one CORESET pools, or that the active BWP of the serving cell is configured with more than one CORE- SET pools, or that each of all BWPs of the serving cell is configured with more than one CORESET pools.

When the UE selects a new candidate RS from a candidate RS set, the UE can activate a CORESET pool associated with the new candidate RS set at a predefined time. The UE will also activate to feed back HARQ-ACK PDCCH and/or PDSCH associated with the CORESET pool. In some implementation, the CORESET pool is deactivated before because the UE cannot select a candidate RS from a candidate RS set when the UE detects beam failure based on a beam failure detecting RS set corresponding to the CORESET pool.

The predefined time starts from a predefined time length after the UE feeds back beam failure information such as one of PRACH-BFR, SR-BFR, BFR MAC-CE. Alternatively, the predefined time starts from a predefined time length after the UE receive response from gNB for the beam failure information such as one of PRACH-BFR, SR-BFR, BFR MAC-CE feedback by the UE.

Implementation 11

The UE is configured with a reference signal resource with a TCI (transmission configuration indication) state which only includes a QCL (Quasi Co Location)-RS associated with QCL-Type D. The UE will receive the reference signal resource. The reference signal resource is for interference measurement. The reference signal is a CLI-RS/SRS for cross link interference measurement. QCL-Type D includes QCL parameter which is spatial Rx parameter.

If the UE is configured with more than one reference signal resource for CLI (cross link interference measurement), the UE will feedback selected CLI resource index and measurement result per selected CLI resource and the receive antenna index of the UE based on which the measurement result is obtained. In some implementation, the UE will feedback multiple groups of selected CLI resources, In this case, i) the selected CLI resources in different groups can be received by the UE simultaneously, ii) the selected CLI resources in same group may not be received by the UE simultaneously, or iii) the selected CLI resources in same group can be received by the UE simultaneously and the selected CLI resources in different group may not be received by the UE simultaneously.

In some implementation, when the QCL-Type D of a CLI resource and other channel/signal collides, the UE will not receive the CLI resource.

In some implementation, if the UE is configured with a CLI resource, the UE determined the QCL-Type D of the CLI resource according to QCL-Type D of a channel/signal with overlap time domain symbol with the CLI resource. The UE will report the measurement result for a CLI resource based on a same QCL-Type D.

Figure 8:
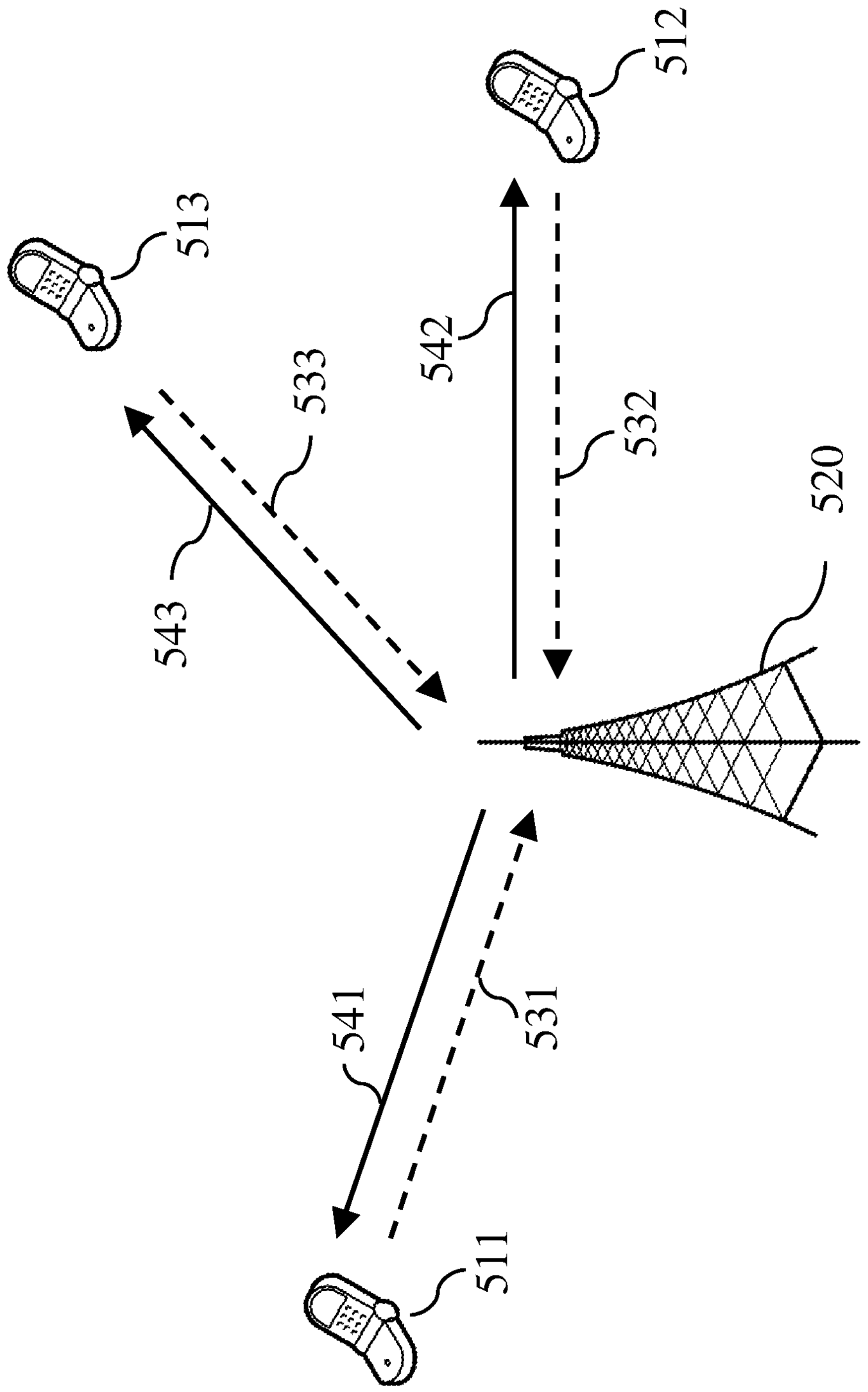
FIG. 8 shows an example of wireless communication including a base station (BS) and user equipment (UE) based on some implementations of the disclosed technology.

The implementations as discussed above will apply to a wireless communication. FIG. 8 shows an example of a wireless communication system (e.g., a 5G or NR cellular network) that includes a BS 520 and one or more user equipment (UE) 511, 512 and 513. In some embodiments, the UEs access the BS (e.g., the network) using implementations of the disclosed technology 531, 532, 533), which then enables subsequent communication (541, 542, 543) from the BS to the UEs. The UE may be, for example, a smartphone, a tablet, a mobile computer, a machine to machine (M2M) device, an Internet of Things (IoT) device, and so on.

Figure 9:
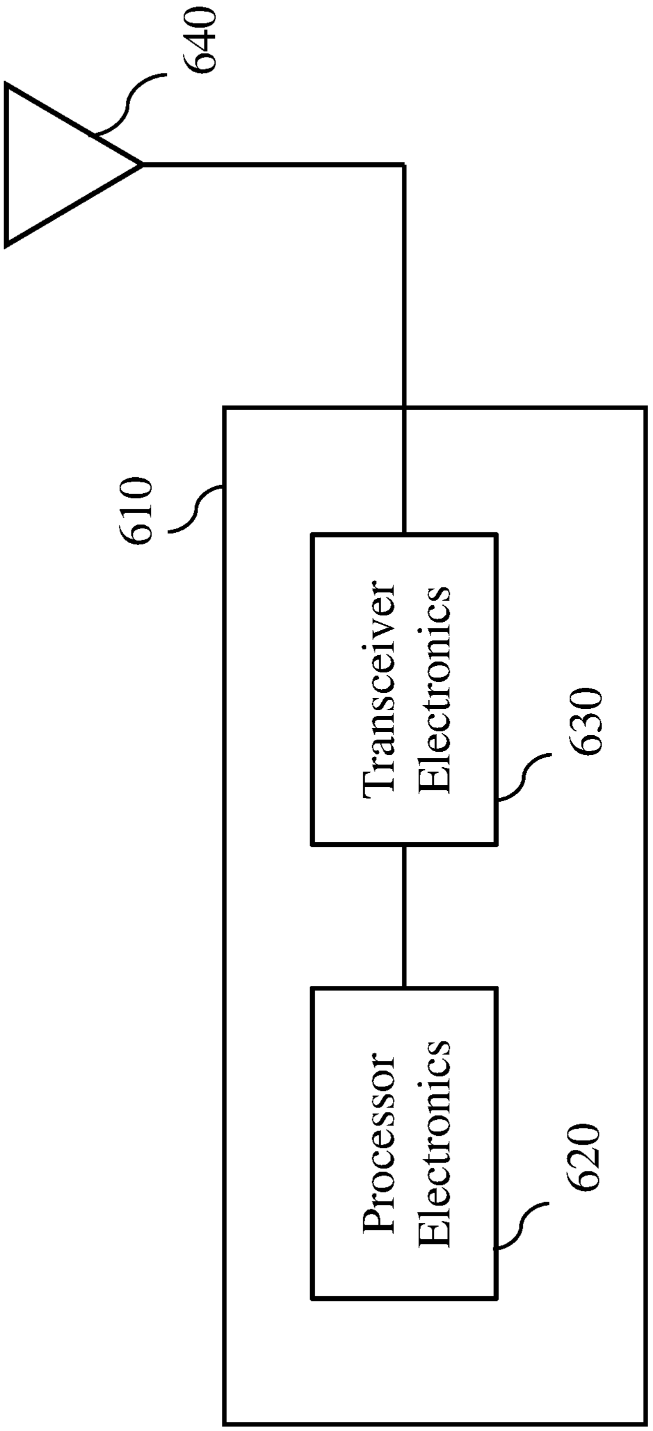
FIG. 9 shows an example of a block diagram of a portion of an apparatus based on some implementations of the disclosed technology.

FIG. 9 shows an example of a block diagram representation of a portion of an apparatus. An apparatus 610 such as a base station or a user device which may be any wireless device (or UE) can include processor electronics 620 such as a microprocessor that implements one or more of the techniques presented in this document. The apparatus 610 can include transceiver electronics 630 to send and/or receive wireless signals over one or more communication interfaces such as antenna 640. The apparatus 610 can include other communication interfaces for transmitting and receiving data. The apparatus 610 can include one or more memories (not explicitly shown) configured to store information such as data and/or instructions. In some implementations, the processor electronics 620 can include at least a portion of transceiver electronics 630. In some embodiments, at least some of the disclosed techniques, modules or functions are implemented using the apparatus 610.

Additional features of the above-described methods/techniques that may be preferably implemented in some implementations are described below using a clause-based description format.

Figure 10A:
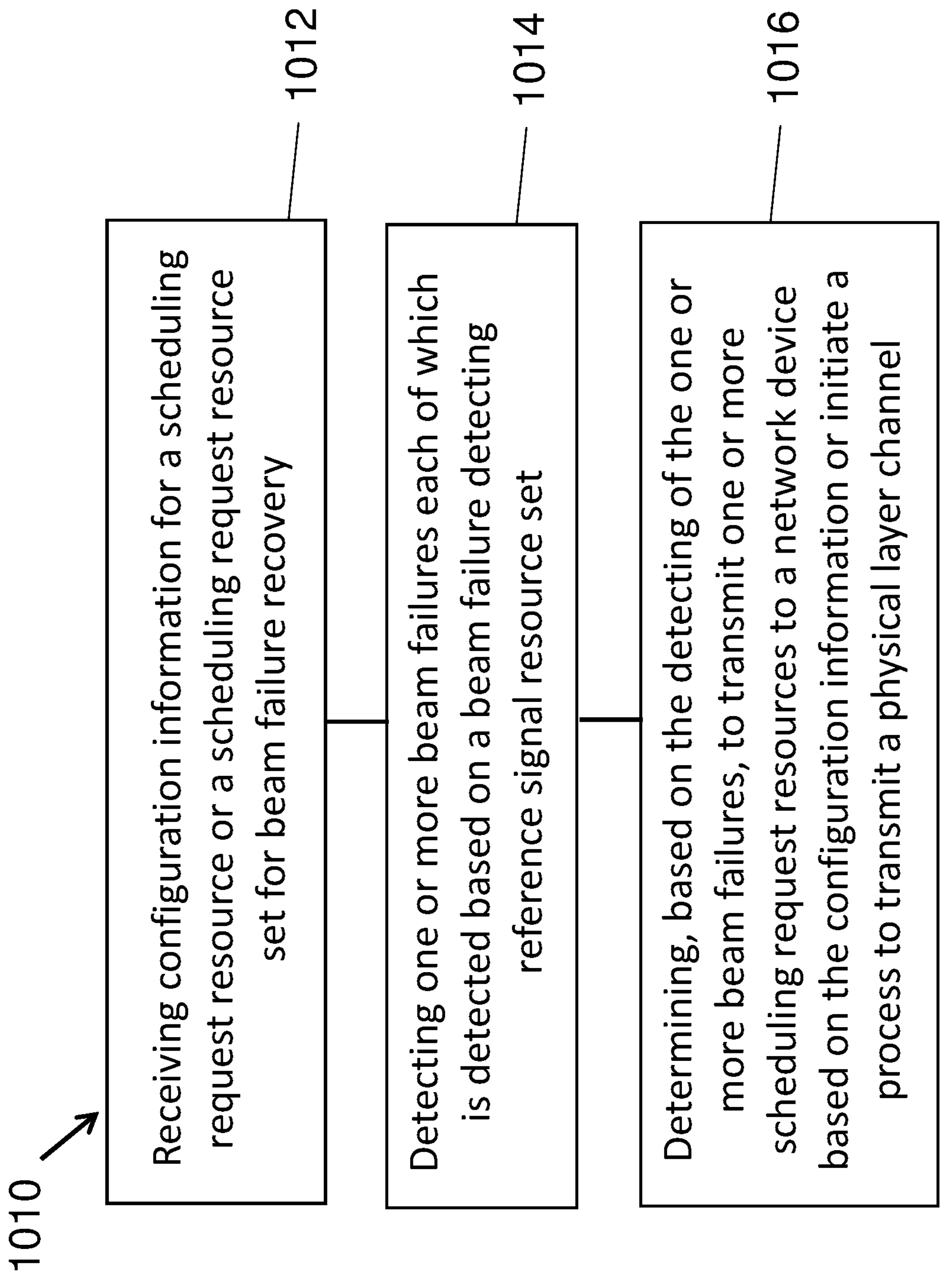
FIGS. 10A to 10F show examples of a method for wireless communication based on some implementations of the disclosed technology.

1. A method of wireless communication (e.g., method 1010 as shown in FIG. 10A), the method performed by a wireless communication device and comprising: receiving 1012 configuration information for a scheduling request resource or a scheduling request resource set for beam failure recovery; detecting 1014 one or more beam failures each of which is detected based on a beam failure detecting reference signal resource set; and determining 1016, based on the detecting of the one or more beam failures, to transmit one or more scheduling request resources to a network device based on the configuration information or initiate a process to transmit a physical layer channel.

2. The method of clause 1, wherein the configuration information includes a first information list and wherein the method further comprises: determining a first information from the first information list; and transmitting a scheduling request resource based on the first information.

3. The method of clause 2, wherein the determining the first information is based on at least one of following:

i) second information associated with the one or more beam failures or one or more beam failure detecting reference signal (RS) resource sets;

ii) a relationship between the second information and a third information associated with the first information;

iii) a relationship between a number of beam failures associated with different parameter indexes;

iv) a number of beam failures which is detected for a serving cell;

v) a number of beam failures which is detected for a serving cell of the first information;

vi) a priority between the different parameter indexes;

vii) a BFR medium access control element (MAC-CE) format;

viii) time domain information of the first information;

ix) a first serving cell set;

x) a signaling received from the network device; or xi) whether no beam failure is detected for a serving cell of the first information.

4. The method of clause 3, wherein the determining the first information includes one of:

i) selecting the first information associated with the third information corresponding to the second information, or ii) selecting the first information associated with the third information which is different from the second information.

5. The method of clause 1, further comprising: determining a first information of a first scheduling request resource of the one or more scheduling request resources based on a control resource set (CORESET) associated with a parameter index different from a parameter index associated with the first scheduling request resource.

6. The method of any of clauses o2 to 6, wherein the first information comprises at least one of a serving cell index, a serving cell list, a parameter index, a parameter index list, a candidate reference signal group, or spatial relation reference signal list, TCI state, or power information.

7. The method of clause 1, wherein the transmitting the one or more scheduling request resources includes determining a first serving cell set, wherein the one or more scheduling request resources on one or more serving cells in the first serving cell set are transmitted.

8. The method of clause 1, wherein the transmitting the one or more scheduling request resources includes determining the one or more scheduling request resources from the scheduling request resource set.

9. The method of clause 8, wherein the determining is based on at least one of:

i) second information associated with the one or more beam failures or one or more beam failure detecting RS reference signal resource sets;

ii) a relationship between the second information and third information of a scheduling request resource in the scheduling request resource set;

iii) a relationship between a number of beam failures associated with different parameter indexes;

iv) a number of beam failure which is detected for a serving cell;

v) a number of beam failure which is detected for a serving cell of an scheduling request resource in the scheduling request resource set;

vi) a priority between the different parameter indexes;

vii) a BFR medium access control element (MAC-CE) format;

viii) time domain information of an scheduling request resource in the scheduling request resource set;

ix) a first serving cell set;

x) a signaling received from the network device; or xi) whether no beam failure is detected for a serving cell of a scheduling request resource in the scheduling request resource set.

10. The method of clause 9, wherein the signaling indicates a relationship between the second information and the third information associated with the one or more scheduling request resources.

11. The method of clause 9, wherein the determining the one or more scheduling request resources includes one of:

selecting a scheduling request resource associated with the third information corresponding to the second information; or selecting a scheduling request resource associated with the third information that is different from the second information.

12. The method of clause 3 or 9, wherein each of the second information and the third information includes at least one of: a serving cell index or a parameter index.

13. The method of clause 6 or 9, wherein the first serving cell set exclude at least one of i) a serving cell for which X beam failures are detected, or ii) a serving cell in a second serving cell set associated with a serving cell for which X beam failures are detected, wherein X is an integer.

14. The method of clause 13, wherein X is greater than 1 and each of the X beam failure is associated with a parameter index.

15. The method of clause 13, wherein X is 1 and wherein the X beam failure is associated with a parameter index same as or different from an parameter index of the one or more scheduling request resources.

16. The method of clause 6 or 9, wherein the first serving cell set includes at least one of: i) a serving cell for which up to Y beam failures are detected; ii) a serving cell in a second serving cell set associated with a serving cell for which up to Y beam failures are detected, and wherein Y is equal to or greater than zero; or iii) a serving cell in a serving cell list configured by the configuration information.

17. The method of clause 16, wherein Y is greater than zero and each of the Y beam failures is associated with a parameter index same as or different from a parameter index of the one or more scheduling request resources.

18. The method of clause 6 or 9, wherein the one or more scheduling request resources are transmitted on a serving cell with lowest serving cell index in the first serving cell set or the one or more scheduling request resources are transmitted on each serving cell in the first serving cell set.

19. The method of clause 6 or 9, wherein the process is initiated when the first serving cell is empty.

20. The method of clause 1, wherein the process is initiated when satisfying at least one of conditions: i) that a beam failure is detected based on a beam failure detecting reference signal set with a parameter index different from an parameter index of a selected scheduling request resource, wherein the beam failure detecting reference set and the selected scheduling request resource are associated with the same serving cell, ii) X beam failures are detected for a serving cell of the scheduling request, or iii) X beam failures are detected for any serving cell in a second serving cell set associated with a serving cell of the scheduling request, wherein X is an integer.

21. The method of clause 13 or 16, wherein a transmission configuration indication (TCI) state updating signaling is applied for all serving cells in the second serving cell set.

22. The method of clause 1, wherein the configuration information includes multiple scheduling request resources each of which is associated with a same parameter index.

23. The method of clause 1, wherein the scheduling request resource set is for a serving cell group.

24. The method of clause 3, 5, 6, 9, 12, 14, 15, 17 or 20, wherein a parameter index includes at least one of an index of a CORESET pool, an index of a PUCCH resource set, an index of a set of channel, an index of beam failure detecting reference signal resource set, an index of candidate reference signal resource set, an index associated with one or more beam failure parameters, a physical cell index (PCI), or an order index of a candidate RS index for a serving cell or for a BWP, or an index of a BFR process for a serving cell or for a BWP.

Figure 10B:
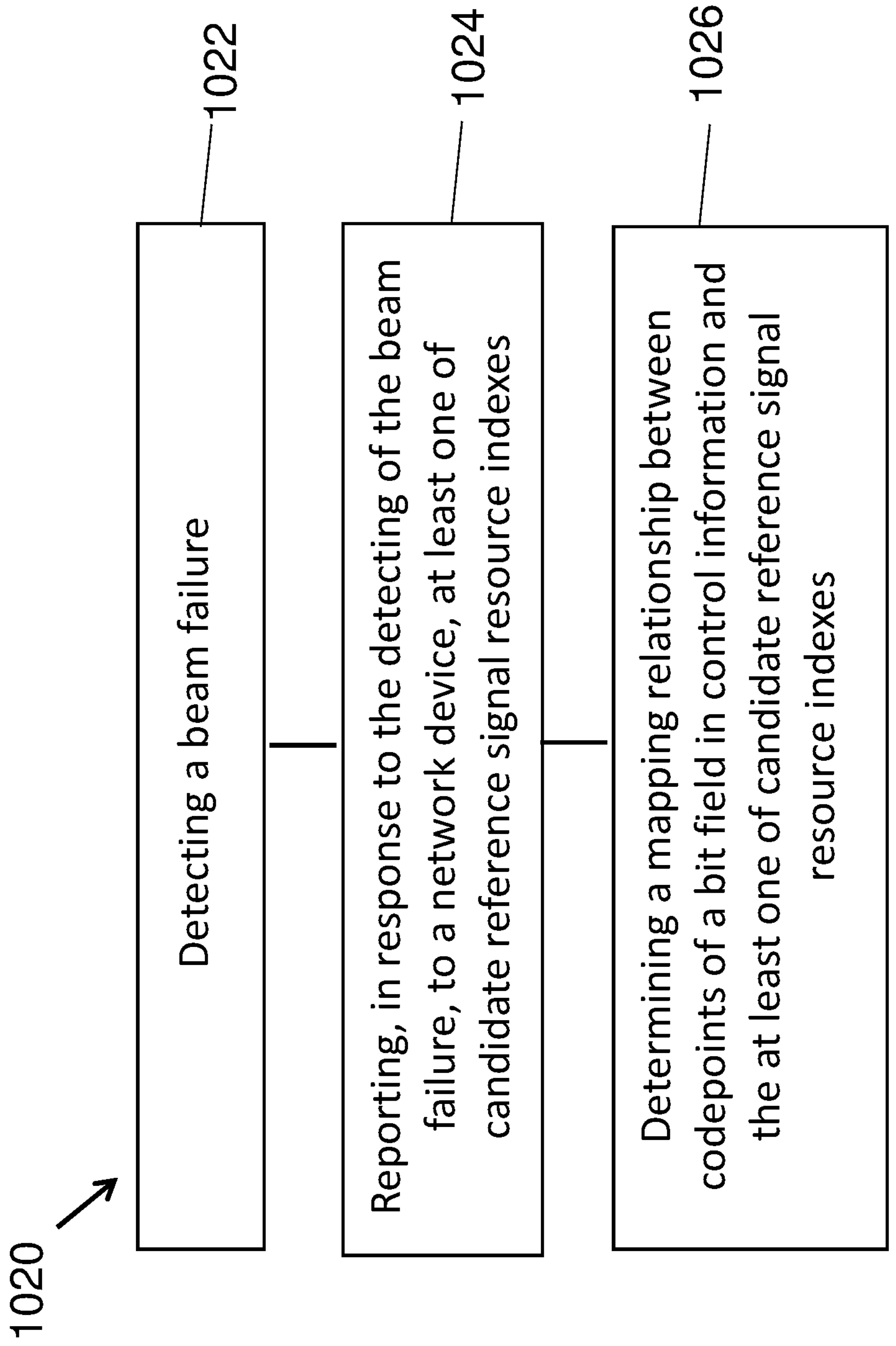

25. A method of wireless communication (e.g., method 1020 as shown in FIG. 10B), performed by a wireless communication device and comprising: detecting 1022 a beam failure; reporting 1024, in response to the detecting of the beam failure, to a network device, at least one of candidate reference signal resource indexes; and determining 1026 a mapping relationship between codepoints of a bit field in control information and the at least one of candidate reference signal resource indexes.

26. The method of clause 25, wherein the determining of the mapping relationship is based on information of the candidate reference signal resource indexes.

27. The method of clause 25, wherein the determining of the mapping relationship is based on a relationship between information of the codepoints and information of the candidate reference signal resource indexes.

28. The method of clause 26 or 27, wherein the information includes at least one of: a serving cell index, a bandwidth part (BWP) index, or a parameter index.

29. The method of clause 28, wherein the parameter index includes at least one of an index of a CORESET pool, an index of a PUCCH resource set, an index of a set of channel, an index of beam failure detecting reference signal resource set, an index of candidate reference signal resource set, an index associated with one or more beam failure parameters, a physical cell index (PCI), or an order index of BFR processes of a serving cell.

30. The method of any of clauses 25 to 29, wherein the bit field is a transmission configuration indication (TCI) bit filed.

Figure 10C:
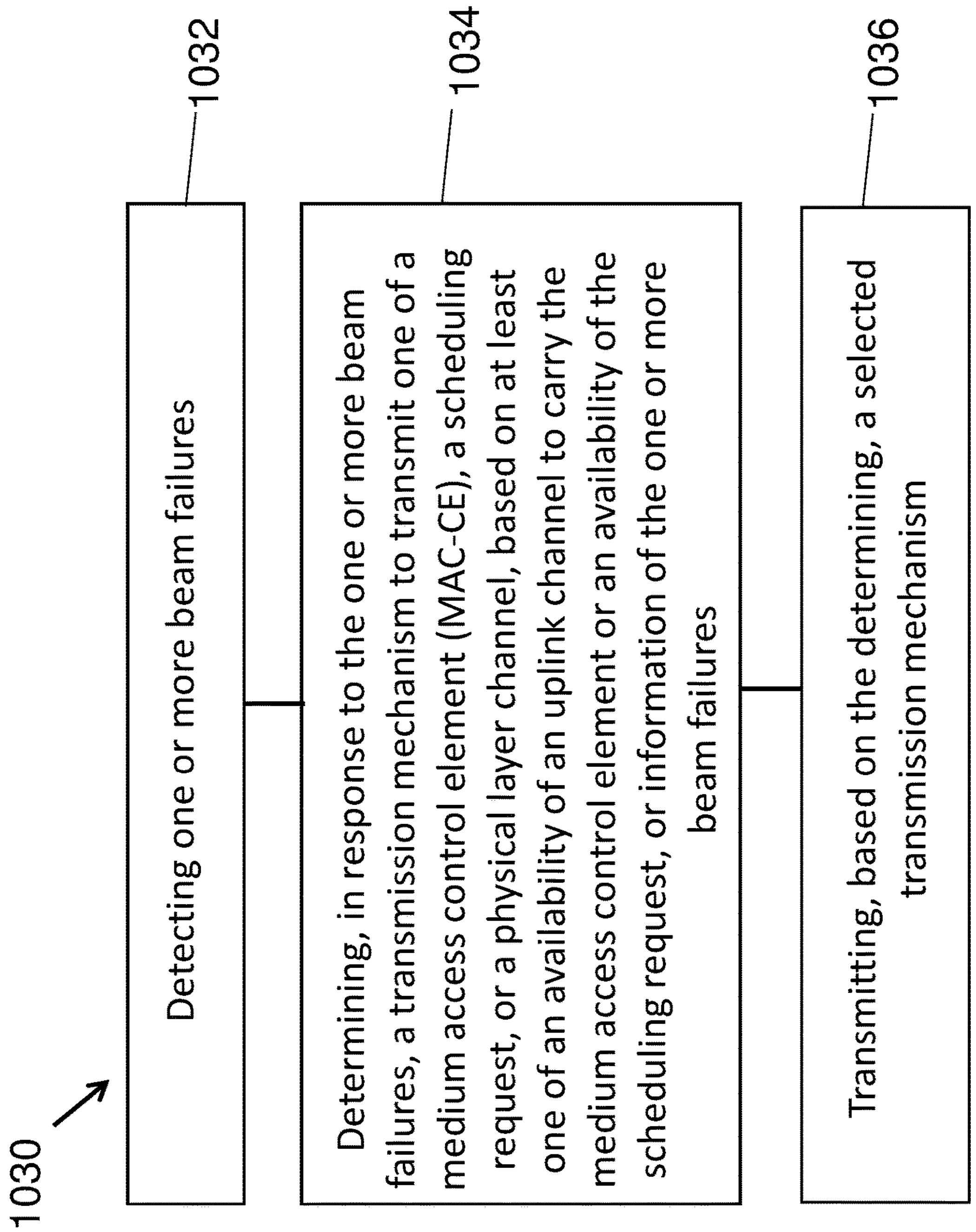

31. A method of wireless communication (e.g., method 1030 as shown in FIG. 10C), performed by a wireless device and comprising: detecting 1032 one or more beam failures; determining 1034, in response to the one or more beam failures, a transmission mechanism to transmit one of a medium access control element (MAC-CE), a scheduling request, or a physical layer channel, based on at least one of an availability of an uplink channel to carry the medium access control element or an availability of the scheduling request, or information of the one or more beam failures; and transmitting 1036, based on the determining, a selected transmission mechanism.

32. The method of clause 31, wherein the selected mechanism is the medium access control element (MAC-CE) in case that an uplink channel to carry the MAC control element is available.

33. The method of clause 31, wherein the selected mechanism is the scheduling request in case that the uplink channel is not available and that the scheduling request is available.

34. The method of clause 31, wherein the selected mechanism is the physical layer channel in case that the uplink channel is not available and that the scheduling request is not available.

35. The method of clause 31, wherein the selected mechanism is the physical layer channel in case that there is no available scheduling request;

36. The method of any of clauses 31 to 35, wherein an availability of the uplink channel is determined based on at least one of: a number of detected beam failures for a serving cell of the uplink channel; a relationship between an parameter index of the one or more beam failures for the serving cell of the uplink channel and a parameter index of the uplink channel, whether there is at least one of beam failure is detected for information associated with the uplink channel.

37. The method of any of clauses 31 to 35, wherein an availability of the scheduling request is determined based on at least one of: a number of detected beam failures for a serving cell of the scheduling request; a relationship between an parameter index of the detected beam failures for a serving cell of scheduling request and a parameter index of the scheduling request; or whether there is at least one of beam failure is detected for information associated with the scheduling request.

38. The method of clause of 31, wherein the determining the transmission mechanism comprises: determining the transmission mechanism based on a relationship between the information of the one or more beam failures and information of a serving cell of a scheduling request resource.

39. The method of clause 31, wherein the transmission mechanism is determined based on a number of detected beam failure for a serving cell of a scheduling request resource.

40. The method of clause 31, wherein the selected mechanism is the physical layer channel when satisfying at least one of following cases:

i) no configuration for any scheduling request resource of BFR is received;

ii) a beam failure is detected based on a beam failure detecting reference signal set with information corresponding to a scheduling request resource which corresponds to the one or more beam failures;

iii) a beam failure corresponding to a scheduling request resource is detected;

iv) X beam failures are detected for a serving cell of a scheduling request resource; or v) X beam failures are detected for a serving cell of a scheduling request resource corresponds to the one or more beam failures, wherein X is equal to or larger than 1, which 41. The method of any of clauses 31 to 40, wherein the information of the one or more beam failures or the information of the special cell includes at least one of: a serving cell index, a parameter index, a number of the detected beam failures for the special cell.

42. The method of any of clauses 31 to 41, wherein the physical layer channel includes a PRACH.

Figure 10D:
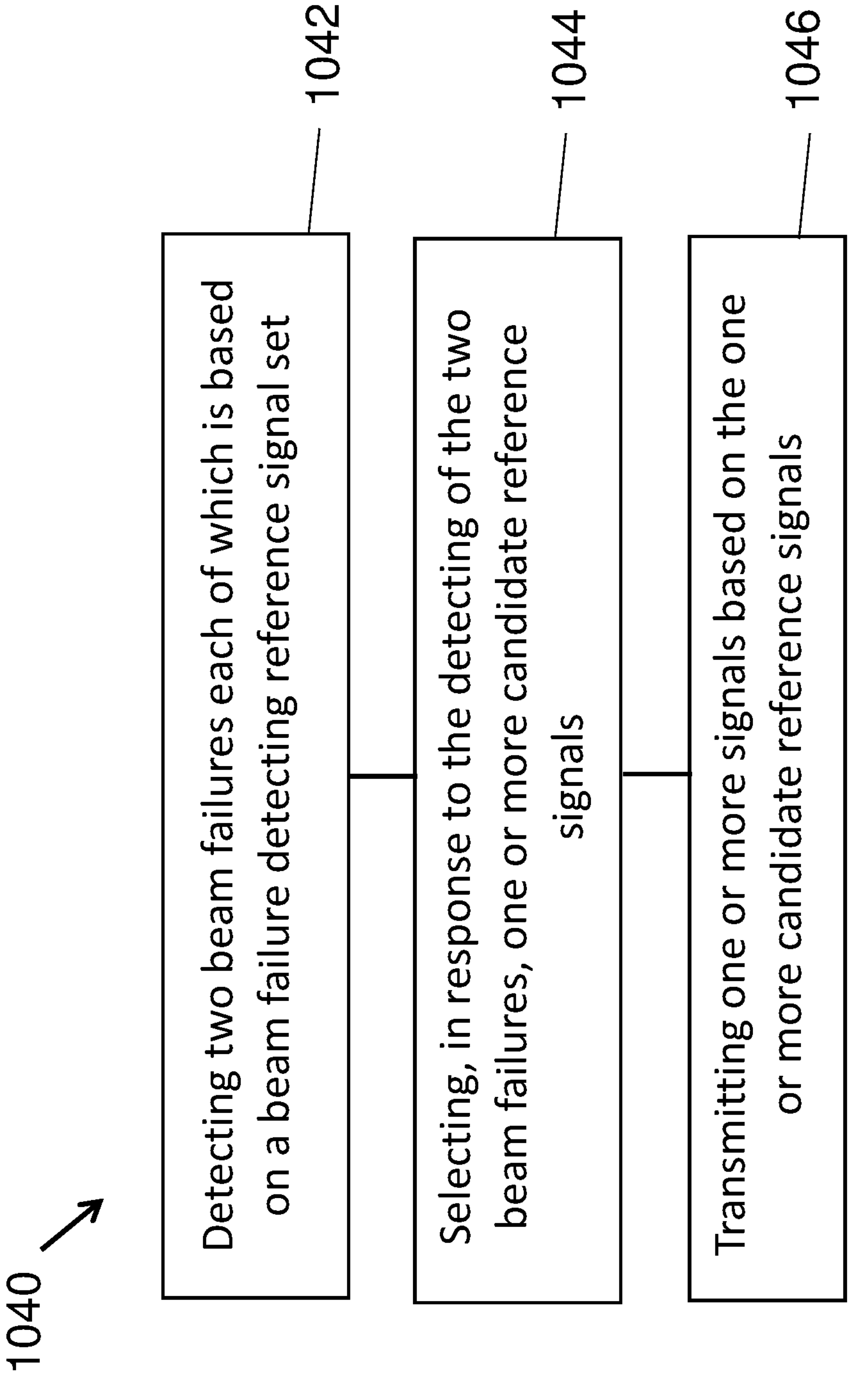

43. A method of wireless communication (e.g., method 1040 as shown in FIG. 10D), performed by a wireless device and comprising: detecting 1042 two beam failures each of which is based on a beam failure detecting reference signal set; selecting 1044, in response to the detecting of the two beam failures, one or more candidate reference signals; and transmitting 1046 one or more signals based on the one or more candidate reference signals.

44. The method of clause 43, wherein the selecting the one or more candidate reference signals comprising: selecting a first candidate reference signal in a first candidate reference signal set.

45. The method of clause 44, wherein the selecting the one or more candidate reference signals further comprises selecting a second candidate reference signal in a second candidate reference signal set.

46. The method of clause 44, further comprising: transmitting a first signal corresponding to the first candidate reference signal; and monitoring a first physical downlink control channel (PDCCH) in a first BFR search space.

47. The method of clause 45, further comprising: transmitting a second signal corresponding to the second candidate reference signal; and monitoring a second physical downlink control channel (PDCCH) in a second BFR search space.

48. The method of clause 47, further comprising: determining a quasi co-location (QCL)-reference signal (RS) of the second BFR search space according to the second candidate RS.

49. The method of clause 46 or 47, further comprising: determining that the transmission of the first signal and the second signal are both successfully completed if any one of the first PDCCH or the second PDCCH is received.

50. The method of clause 46, further comprising: transmitting a second signal corresponding to the second candidate reference signal; and determining that the transmission of the first signal and the second signal are both successfully completed if the first PDCCH is received.

51. The method of clause 46 or 49, further comprising: determining a quasi co-location (QCL)-reference signal (RS) of the first BFR search space based on at least one of the first candidate reference signal, or the second candidate reference signal.

52. The method of clause 43, wherein a signal corresponds to a candidate reference signal set including the one or more candidate reference signal and wherein the method further comprises further comprising: monitoring a physical downlink control channel (PDCCH) in a BFR search space; and determining a quasi co-location (QCL)-reference signal (RS) of the first BFR search space based on the one or more candidate reference signals.

53. The method of clause 43, further comprising: receiving configuration information including mapping between a signal and a candidate reference signal set; and transmitting the signal mapped to the candidate reference signal set including the one or more candidate reference signals.

54. The method of clause 53, further comprising: transmitting an MAC-CE including at least one of: a relative index of the one or more candidate reference signals in the candidate reference signal set, or whether a number of the one or more candidate reference signals is smaller than a number of candidate reference signals in the candidate reference signal set.

55. The method of any of clauses 43 to 54, wherein the signal includes a PRACH resource or a scheduling request.

Figure 10E:
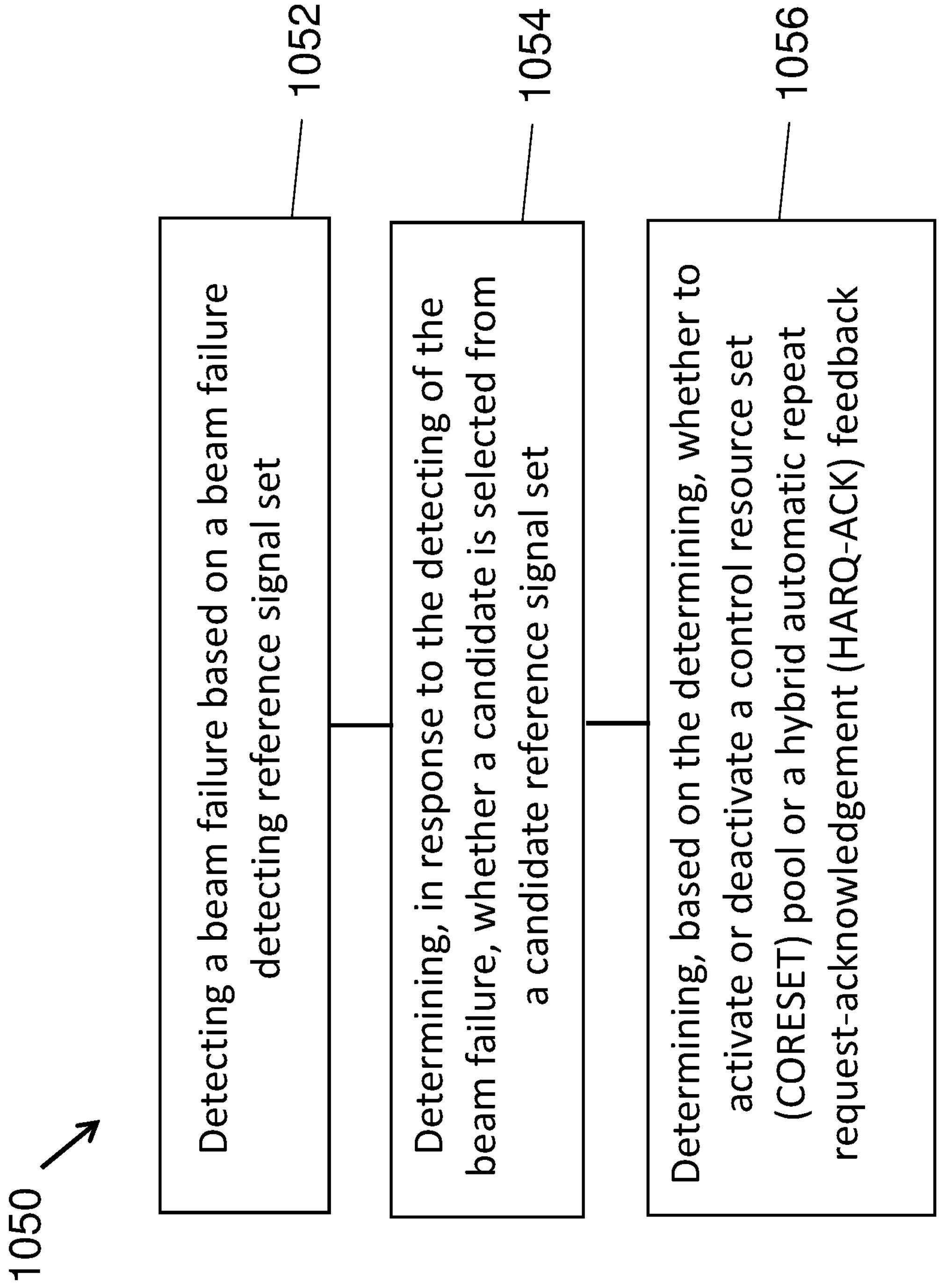

56. A method of wireless communication (e.g., method 1050 as shown in FIG. 10E), performed by a wireless device and comprising: detecting 1052 a beam failure based on a beam failure detecting reference signal set; determining 1054, in response to the detecting of the beam failure, whether a candidate is selected from a candidate reference signal set; and determining 1056, based on the determining, whether to activate or deactivate a control resource set (CORESET) pool or a hybrid automatic repeat request-acknowledgement (HARQ-ACK) feedback.

57. The method of clause 56, wherein, in response to the determining that the candidate is not selected from the candidate reference signal set, at least one of the CORESET pool or the HARQ-ACK feedback is deactivated.

58. The method of clause 56, wherein, in response to the determining that the candidate is selected from the candidate reference signal set, at least one of the CORESET pool or the HARQ-ACK feedback is activated.

59. The method of any of clauses 56 to 58, wherein the CORESET pool corresponds to the beam failure detecting reference signal set, and/or the HARQ-ACK is for a physical downlink control channel (PDCCH) or a physical downlink shared channel (PDSCH) that is associated with the CORESET pool.

60. The method of any of clauses 56 to 59, wherein whether to activate or deactivate the CORESET pool or the HARQ-ACK feedback is determined at a predefined time and further based on a predefined condition.

61. The method of clause 60, wherein the predefined condition includes at least one of:

i) the CORESET pool is not in a special cell (SPcell);

ii) a serving cell associated with the beam failure detecting reference signal set is configured with more than one CORESET pools; or iii) any beam failure is not detected for all of beam failure detecting RS sets of a serving cell or a bandwidth part (BWP) that is associated with the beam failure.

Figure 10F:
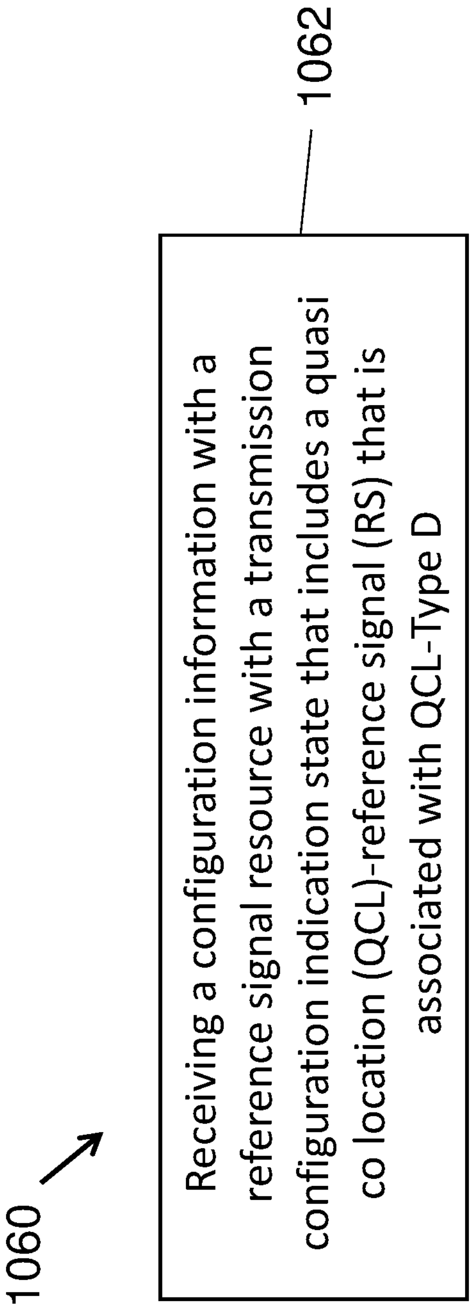

62. A method of wireless communication (e.g., method 1060 as shown in FIG. 10F), performed by a wireless device and comprising: receiving 1062 a configuration information with a reference signal resource with a transmission configuration indication state that includes a quasi co location (QCL)-reference signal (RS) that is associated with QCL-Type D.

63. The method of clause 62, wherein the transmission configuration indication state includes the QCL-Type D only.

64. The method of clause 62, further comprising: determining whether to receive the reference signal resource in case that the QCL-Type D and a QCL-Type D of another signal or another channel are different from each other, wherein the reference signal resource and the another signal or another channel overlaps at least one of time domain symbol.

65. The method of clause 62, further comprising: determining the QCL-Type D of the reference signal resource based on another signal or another channel that overlaps with the reference signal resource in a time domain symbol.

66. The method of clause 62, further comprising: selecting one or more reference signals from a reference signal set; and reporting group information of the one or more reference signal.

67. The method of clause 66, wherein a reference signal is a cross link interference (CLI)-reference signal (RS) or a sounding reference signal (SRS) for a cross link interference measurement.

68. The method of any of clauses 1 to 67, wherein a parameter index includes at least one of an index of a CORESET pool, an index of a PUCCH resource set, an index of a set of channel, an index of beam failure detecting reference signal resource set, an index of candidate reference signal resource set, an index associated with one or more beam failure parameters, a physical cell index (PCI), an order index of a candidate RS index for a serving cell or for a BWP, or an index of a BFR process for a serving cell or for a BWP.

69. A communication apparatus comprising a processor configured to implement a method recited in any one or more of clauses 1 to 68.

70. A computer readable medium having code stored thereon, the code, when executed, causing a processor to implement a method recited in any one or more of clauses 1 to 68.

In some embodiments, a base station may be configured to implement some or all of the base station side techniques described in the present document.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, the method performed by a wireless communication device and comprising:

receiving, from a base station, configuration information for a scheduling request resource set for beam failure recovery, wherein the scheduling request resource set includes two scheduling request resources for beam failure recovery;

detecting one or more beam failures each of which is detected based on a corresponding beam failure detecting reference signal resource set from one or more beam failure detecting reference signal resource sets;

determining a count of beam failure instance indications based on detecting the corresponding beam failure detecting reference signal resource set, wherein each of the one or more beam failures indicates that the count of beam failure instances has reached a predefined number, wherein when radio link quality of all reference signals in the corresponding beam failure detecting reference signal resource set is worse than a threshold, the count of beam failure instance indications is incremented by one, wherein one or more scheduling request resources are selected from the scheduling request resource set based on a first serving cell set, wherein the first serving cell set excludes a serving cell for which X beam failures are detected, wherein X is greater than 1 and each of the X beam failures is associated with a parameter index, wherein when a time difference between two successive beam failure instance indications is greater than a value, the count of beam failure instance indications is set to zero; and determining, based on the count of beam failure instance indications, whether to transmit the one or more scheduling request resources to the base station or initiate a process to transmit a Physical Random Access Channel (PRACH), wherein the process to transmit the PRACH is initiated when two beam failures are detected for a special serving cell (SPCell), wherein the SPCell is configured with two beam failure detecting reference signal resource sets and the two beam failures are respectively detected based on the two beam failure detecting reference signal resource sets, and wherein when one or less beam failure is detected for the SPCell, the one or more scheduling request resources are selected from the scheduling request resource set for beam failure recovery based on a relationship between the one or more beam failures and the two scheduling request resources in the scheduling request resource set.

2. The method of claim 1, wherein the one or more scheduling request resources are selected from the scheduling request resource set further based on at least one of:

(i) a number of beam failure which is detected for a serving cell; or (ii) a number of beam failure which is detected for a serving cell of a scheduling request resource in the scheduling request resource set.

3. The method of claim 1, further comprising: selecting, from the scheduling request resource set, each of the one or more scheduling request resources associated with third information which is same as second information for at least one of the one or more beam failures, wherein at least one beam failure is associated with the second information.

4. The method of claim 3, wherein each of the second information and the third information includes a parameter index.

5. The method of claim 4, wherein each of the second information and the third information further includes a serving cell index.

6. The method of claim 4, wherein the parameter index includes at least one of an index of beam failure detecting reference signal resource set or an index of a BFR process for a BWP.

7. The method of claim 1, wherein the first serving cell set includes a serving cell for which up to Y beam failures are detected, wherein Y is greater than zero and each of the Y beam failures is associated with a parameter index same as a parameter index of one of the one or more scheduling request resources.

8. The method of claim 7, wherein the parameter index includes at least one of an index of beam failure detecting reference signal resource set or an index of a BFR process or for a BWP.

9. The method of claim 1, wherein the SPCell is a serving cell of the scheduling request resource set.

10. The method of claim 1, further comprising:

when one or less beam failure is detected for the SPCell: transmitting a beam failure recovery-medium access control element (MAC-CE) in an uplink shared channel when an uplink shared channel is available, or transmitting the one or more scheduling request resources to the base station.

11. A method of wireless communication, the method performed by a network device and comprising:

transmitting, to a wireless communication device, configuration information for a scheduling request resource set for beam failure recovery, wherein the scheduling request resource set includes two scheduling request resources for beam failure recovery;

detecting one or more scheduling request resources from the wireless communication device and detecting a Physical Random Access Channel (PRACH) from the wireless communication device, wherein if the PRACH is detected, it means that two beam failures are detected by the wireless communication device for a special serving cell (SPCell), wherein the SPCell is configured with two beam failure detecting reference signal resource sets and the two beam failures are detected by the wireless communication device based on the two beam failure detecting reference signal resource sets respectively, wherein each of the two beam failure indicates that a count of beam failure instances has reached a predefined number, wherein the wireless communication device is configured to increment the count of beam failure instance indications by one when radio link quality of all reference signals in a corresponding beam failure detecting reference signal resource set from the two beam failure detecting reference signal resource sets is worse than a threshold, wherein the wireless communication device is configured to set the count of beam failure instance indications to zero when a time difference between two successive beam failure instance indications is greater than a value, wherein one or more scheduling request resources from the scheduling request resource set are based on a first serving cell set, wherein the first serving cell set excludes a serving cell for which X beam failures are detected, wherein X is greater than 1 and each of the X beam failures is associated with a parameter index, and wherein the one or more scheduling request resources are from the scheduling request resource set for beam failure recovery based on a relationship between the one or more beam failures and of the two scheduling request resources in the scheduling request resource set.

12. The method of claim 11, wherein the one or more scheduling request resources are from the scheduling request resource set further based on at least one of:

(i) a number of beam failure which is detected for a serving cell; or (ii) a number of beam failure which is detected for a serving cell of an scheduling request resource in the scheduling request resource set.

13. The method of claim 11, further comprising:

when one or less beam failure is detected for the SPCell: receiving a beam failure recovery-medium access control element (MAC-CE) in an uplink shared channel when an uplink shared channel is available, or receiving the one or more scheduling request resources from the wireless communication device.

14. A wireless communication apparatus comprising processor electronics configured to perform:

receiving, from a base station, configuration information for a scheduling request resource set for beam failure recovery, wherein the scheduling request resource set includes two scheduling request resources for beam failure recovery;

detecting one or more beam failures each of which is detected based on a corresponding beam failure detecting reference signal resource set from one or more beam failure detecting reference signal resource sets;

determining a count of beam failure instance indications based on detecting the corresponding beam failure detecting reference signal resource set, wherein each of the one or more beam failures indicates that the count of beam failure instances has reached a predefined number, wherein when radio link quality of all reference signals in the corresponding beam failure detecting reference signal resource set is worse than a threshold, the count of beam failure instance indications is incremented by one, wherein one or more scheduling request resources are selected from the scheduling request resource set based on a first serving cell set, wherein the first serving cell set excludes a serving cell for which X beam failures are detected, wherein X is greater than 1 and each of the X beam failures is associated with a parameter index, wherein when a time difference between two successive beam failure instance indications is greater than a value, the count of beam failure instance indications is set to zero; and determining, based on the count of beam failure instance indications, whether to transmit the one or more scheduling request resources to the base station or initiate a process to transmit a Physical Random Access Channel (PRACH), wherein the process to transmit the PRACH is initiated when two beam failures are detected for a special serving cell (SPCell), wherein the SPCell is configured with two beam failure detecting reference signal resource sets and the two beam failures are respectively detected based on the two beam failure detecting reference signal resource sets, and wherein when one or less beam failure is detected for the SPCell, the one or more scheduling request resources are selected from the scheduling request resource set for beam failure recovery based on a relationship between the one or more beam failures and the two scheduling request resources in the scheduling request resource set.

15. The wireless communication apparatus of claim 14, wherein t the one or more scheduling request resources are selected from the scheduling request resource set further based on at least one of:

(i) a number of beam failure which is detected for a serving cell; or (ii) a number of beam failure which is detected for a serving cell of a scheduling request resource in the scheduling request resource set.

16. The wireless communication apparatus of claim 14, wherein the processor electronics is further configured to perform: selecting, from the scheduling request resource set, each of the one or more scheduling request resources associated with third information which is same as second information for at least one of the one or more beam failures, wherein at least one beam failure is associated with the second information.

17. The wireless communication apparatus of claim 16, wherein each of the second information and the third information includes a parameter index.

18. The wireless communication apparatus of claim 17, wherein each of the second information and the third information further includes a serving cell index.

19. The wireless communication apparatus of claim 17, wherein the parameter index includes at least one of an index of beam failure detecting reference signal resource set or an index of a BFR process for a BWP.

20. The wireless communication apparatus of claim 14, wherein the processor is further configured to perform:

when one or less beam failure is detected for the SPCell: transmit a beam failure recovery-medium access control element (MAC-CE) in an uplink shared channel when an uplink shared channel is available, or transmit the one or more scheduling request resources to the base station.

* * * * *